United States Patent
Leonard et al.

(10) Patent No.: US 11,062,250 B1
(45) Date of Patent: Jul. 13, 2021

(54) SYSTEM AND METHOD FOR DATABASE ARCHITECTURE FOR ELECTRONIC DATA OPTIMIZATION AND MANAGEMENT

(71) Applicant: Advanced Pricing Logic, Inc., Seal Beach, CA (US)

(72) Inventors: David H. Leonard, Irvine, CA (US); Sergio Ferragut, Temecula, CA (US); Thomas D. Crump, Huntington Beach, CA (US)

(73) Assignee: Advanced Pricing Logic, Inc., Seal Beach, CA (US)

( * ) Notice: Subject to any disclaimer, the term of this patent is extended or adjusted under 35 U.S.C. 154(b) by 336 days.

(21) Appl. No.: 15/966,555

(22) Filed: Apr. 30, 2018

Related U.S. Application Data

(60) Provisional application No. 62/492,763, filed on May 1, 2017.

(51) Int. Cl.
| | |
|---|---|
| *G06F 17/11* | (2006.01) |
| *G06F 16/23* | (2019.01) |
| *G06Q 10/06* | (2012.01) |
| *G06F 16/11* | (2019.01) |
| *G06F 16/16* | (2019.01) |

(52) U.S. Cl.
CPC ..... *G06Q 10/06375* (2013.01); *G06F 16/122* (2019.01); *G06F 16/168* (2019.01); *G06F 16/23* (2019.01); *G06F 17/11* (2013.01)

(58) Field of Classification Search
CPC ... G06Q 10/06375; G06F 16/23; G06F 16/10; G06F 16/122; G06F 16/11; G06F 16/168; G06F 17/11; G06F 17/10
See application file for complete search history.

(56) References Cited

U.S. PATENT DOCUMENTS

| | | | | |
|---|---|---|---|---|
| 7,464,095 | B2 * | 12/2008 | Vadavia | G06F 16/252 |
| 2004/0078430 | A1 * | 4/2004 | Aubert | G06Q 10/06 709/204 |
| 2009/0018996 | A1 * | 1/2009 | Hunt | G06F 16/2264 |
| 2015/0074562 | A1 * | 3/2015 | Frieder | G06F 16/22 715/760 |
| 2016/0366036 | A1 * | 12/2016 | Gupta | H04L 67/16 |
| 2017/0017712 | A1 * | 1/2017 | Gartland | G06Q 40/04 |

OTHER PUBLICATIONS

Chuck Ballard, Dynamic Warehousing: Data Mining Made Easy, Sep. 6, 2007 (Year: 2007).*
David Simchi-Levi, "The New Frontier in Price Optimization" MIT Sloan Executive Education, May 4, 2016, 49 pages.
David Simchi-Levi, "The New Frontier of Price Optimization" MIT Sloan Executive Education, Sep. 7, 2017, 8 pages.

* cited by examiner

*Primary Examiner* — Timothy Padot
*Assistant Examiner* — Francis Z. Santiago Merced
(74) *Attorney, Agent, or Firm* — Knobbe, Martens, Olson & Bear, LLP

(57) ABSTRACT

Embodiments of an architecture for large scale key factor optimization and management are disclosed. The architecture may include an optimization and management system that uses existing data to characterize items, group them based on user selected similarity criteria and/or user-selected objectives for the performance metrics, further allowing the user to define target objectives for each group and through forecasting of the impact of the key factor value changes, select the adjusted key factor values that better achieve the selected objectives.

19 Claims, 18 Drawing Sheets

200 ⤺

202 Pre-clustering of electronic extracted dataset

204 Automated updates selection

206 Automated adjustment

302 Access extracted dataset

304 Access data items by segmenting the data items using user-selected segmentation criteria resulting in analytic segments

306 Extract segment specific data from extracted dataset

308 Calculate a plurality of performance metrics by generating value driver data points using extracted segment specific data

310 Execute standardization algorithm using value driver data points to generate encoded value driver data points

312 Receive a selection of value drivers to use for clustering

314 Apply a clustering algorithm to the encoded value driver data points and the selected value drivers to generate clusters of behavior groupings

FIG. 3

| Period: 2016 Sales | Category = Toys<br>SKU Count = 2000 | Category = Toys & Furniture<br>SKU Count = 50 | Category = Furniture<br>SKU Count = 600 |
|---|---|---|---|
| Retail-Stores<br>Retail-Online<br>Customers = 18,000 | Sales $ = 5,000,000.00<br>Sales Units = 45,000<br>Customers = 15,500 | Sales $ = 150,000.00<br>Sales Units = 2,500<br>Customers = 1000 | Sales $ = 3,000,000.00<br>Sales Units = 15,000<br>Customers = 4000 |
| Wholesale<br>Customers = 500 | Sales $ = 2,000,000.00<br>Sales Units = 20,000<br>Customers = 300 | Sales $ = 200,000.00<br>Sales Units = 3,000<br>Customers = 350 | Sales $ = 2,500,000.00<br>Sales Units = 15,000<br>Customers = 400 |
| Master Distributor<br>Customers = 50 | Sales $ = 2,500,000.00<br>Sales Units = 30,000<br>Customers = 50 | Sales $ = 100,000.00<br>Sales Units = 4,500<br>Customers = 50 | Sales $ = 2,500,000.00<br>Sales Units = 20,000<br>Customers = 50 |

Rows: Sales by Price List(s); Columns: Product Segments

FIG. 7

| | | Product Segments | | |
|---|---|---|---|---|
| | Period:<br>2016 Sales | Category = Toys<br>SKU Count = 2000 | Category = Toys & Furniture<br>SKU Count = 50 | Category = Furniture<br>SKU Count = 600 |
| Sales by Price List(s) | Retail-Stores<br>Retail-Online<br>Customers = 18,000 | Sales Rate = 0-250 Units/Month<br>Gross Margin = 20%-50%<br>... | Sales Rate = 0-20 Units/Month<br>Gross Margin = 40%-60%<br>... | Sales Rate = 0-50 Units/Month<br>Gross Margin = 45%-65%<br>... |
| | Wholesale<br>Customers = 500 | Sales Rate = 0-50 Units/Month<br>Gross Margin = 10%-40%<br>... | Sales Rate = 0-10 Units/Month<br>Gross Margin = 30%-50%<br>... | Sales Rate = 0-30 Units/Month<br>Gross Margin = 40%-60%<br>... |
| | Master<br>Distributor<br>Customers = 50 | Sales Rate = 0-100 Units/Month<br>Gross Margin = 5%-35%<br>... | Sales Rate = 0-20 Units/Month<br>Gross Margin = 15%-45%<br>... | Sales Rate = 0-35 Units/Month<br>Gross Margin = 25%-45%<br>... |
| | (All Price Lists) | Days on Hand = 0-365 Days | Days on Hand = 0-730 Days | Days on Hand = 0-60 Days |

FIG. 8

| Days on Hand | | SKU Count | Units | Revenue |
|---|---|---|---|---|
| Highest | | 5,200 | 51,000 | $1,600,000 |
| High | | 2,500 | 28,000 | $1,400,000 |
| Medium | | 1,300 | 33,000 | $1,900,000 |
| Low | | 500 | 25,000 | $1,300,000 |
| Lowest | | 6,700 | 78,000 | $5,900,000 |

FIG. 17

| | | | | Behavior Segments | | | | |
|---|---|---|---|---|---|---|---|---|
| | Name | # of Products | Exclude | Average Sales Rate | Value Drivers | | | |
| | | | | | Average Gross Margin | Average Days on Hand | | |
| | Very low sales, low margin, and high inventory. | 55 | ☐ | 0.23 ↓↓ | 24.02% ↓↓ | 216.10 ↑↑ | | |
| | Very low sales, high margin and inventory. | 72 | ☐ | 0.50 ↓↓ | 51.30% ↑ | 113.40 ↑ | | |
| | Very high sales and margin: well Stocked. | 21 | ✓ | 7.64 ↑↑ | 74.158% ↑↑ | 27.63 → | | |
| | Low sales and margin: well Stocked. | 58 | ☐ | 1.13 → | 29.41% → | 48.02 ☐ | | |
| | Low sales, very low inventory, and high margin | 32 | ☐ | 0.77 ↑ | 39.81% ↑ | 9.58 ↓↓ | | |
| | Very low sales, margin, and no inventory. | 46 | ☐ | 0.12 ↓↓ | 20.90% ↓↓ | 0.00 ↓↓ | | |

1710

Total Items: 6  Displayed: 6

Launch Auto-Slover ↑

Low sales and margin: well stocked. - Business Objectives:

| Target Measure | Action | Target value | Required Level | Relative Weight | Delete | Edit |
|---|---|---|---|---|---|---|
| Profit Margin % Change vs. Projected | Maximize | | 1.00% | 30 | 🗑 | ✏ |
| Unit Sales % Change vs. Projected | Active Target Value | 10.00% | | 70 | 🗑 | ✏ |

1720

Total Items: 2  Displayed: 2

Copy to Segments...  Remove All Objectives...

Ⓧ Cancel   💾 Save

FIG. 18

SYSTEM AND METHOD FOR DATABASE ARCHITECTURE FOR ELECTRONIC DATA OPTIMIZATION AND MANAGEMENT

PRIORITY INFORMATION

This application claims priority to U.S. Provisional Patent Application No. 62/492,763, filed on May 1, 2017, entitled "SYSTEM AND METHOD FOR PRODUCT PERFORMANCE-BASED PRICE OPTIMIZATION AND MANAGEMENT," which is hereby incorporated by reference herein in its entirety.

LIMITED COPYRIGHT AUTHORIZATION

A portion of the disclosure of this patent document includes material which is subject to copyright protection. The copyright owner has no objection to the reproduction by anyone of the patent document or the patent disclosure as it appears in the U.S. Patent and Trademark Office patent file or records, but otherwise reserves all copyrights whatsoever.

BACKGROUND

The disclosure relates to database architectures to support large-scale data processing and analytics.

SUMMARY OF THE DISCLOSURE

Various systems, methods, and devices are disclosed for providing a database architecture and processing for data optimization and related analytics. The systems, methods, and devices of the disclosure each have several innovative aspects, no single one of which is solely responsible for the desirable attributes disclosed herein.

In one embodiment, a system for executing a data value adjustment routine that automatically adjusts data is disclosed. The system can include: a network interface configured to provide remote access to a system via a remote computing device operated by a user; a hardware processor configured to execute computer-executable instructions; a user interface module configured to electronically communicate with the hardware processor and storing instructions that when executed by the hardware processor instruct the hardware processor to: provide instructions for generating a graphical interface on the display by the user at the remote computing device; a pre-processing module configured to electronically communicate with the hardware processor and storing instructions that when executed by the hardware processor instruct the hardware processor to: access an electronic dataset which: (a) comprises data for plurality of data items, and (b) is related to a first electronic entity identifier; access data items by segmenting the data items using user-selected segmentation criteria resulting in analytic segments; for each analytic segment: access segment specific data from the extracted dataset; calculate a plurality of performance metrics called value drivers by generating value driver data points using the extracted segment specific data; execute a standardization algorithm using the plurality of value driver data points to generate a plurality of encoded value driver data points categories including one or more rules for equalizing the value driver data point categories for varying plurality of value data driver points across the analytic segments; receive a selection of value drivers to use for clustering; apply a clustering algorithm to the plurality of encoded value driver data points using the selected value drivers to generate clusters of behavior groupings that share similar value driver data point values; an automated update module configured to electronically communicate with the hardware processor and storing instructions that when executed by the hardware processor instruct the hardware processor to: receive an indication of a selected set of data items associated with one or more segments related to the first electronic entity identifier; for each cluster of behavior groupings, determine a strategy related to the first electronic entity identifier, wherein the strategy is selected by the user or is determined by user-selected criteria based on objectives of strategy metrics; extract data related to records for the selected set of data items within the extracted dataset; execute a data value update routine that adjusts data values associated with a first data characteristic to generate adjusted data values, wherein the data value update routine includes: automatically adjusting the data values using the plurality of sets of executable rules to generate adjusted data values; determining a baseline forecast over a baseline time period and projected forecast over a projection time period using the data values; and performing an impact analysis to forecast an impact of the adjusted data values using the adjusted data values to generate a set of resulting objective measurements; provide a first graphical user interface data for displaying a set of objective outcomes to the remote computing device; receive a selection from the remote computing device a preferred outcome; generate an updated data set associated with the selected preferred outcome correlating to the adjusted data values; and automatically transmit the updated data set to the remote computing device to apply the updated data set to the client dataset.

In another embodiment, a method for executing an adjustment routine that automatically adjusts data by performing impact analysis to forecast an impact of the adjusted data on a set of metrics based on a baseline forecast, a projected forecast, and seasonality factors is disclosed. The method can include: accessing an electronic dataset which: (a) comprises data for plurality of data items including data management data, and (b) is related to a first electronic entity identifier; accessing data items by segmenting the data items using user-selected segmentation criteria resulting in analytic segments; for one or more analytic segments: extracting segment specific data from the dataset; calculating a plurality of performance metrics by generating one or more value driver data points using the extracted segment specific data; accessing an indication of a selected value driver to use for clustering; applying a clustering algorithm to the one or more value driver data points using the selected value drivers to generate clusters of behavior groupings that share similar value driver data points; determining a selected set of data items associated with one or more segments related to the first electronic entity identifier; determining a strategy related to the first electronic entity identifier, wherein the strategy is selected by the user or is determined by user-selected criteria based on objectives of strategy metrics; extracting data related to records for the selected set of data items within the dataset; executing an adjustment routine that adjusts one or more data values within the extracted data, wherein the adjustment routine includes: automatically adjusting the one or more data values using a set of executable rules; determining a baseline forecast over a baseline time period, projected forecast over a projection time period, or one or more seasonality factors associated with the selected set of data items based on the extracted data; and performing an impact analysis based on the baseline forecast, the projected forecast, or the one or more seasonality factors to forecast the impact of the adjusted one or more data values to generate a first set of resulting objective measurements; generating an updated dataset associated with a preferred outcome including the adjusted one or more data values, wherein the preferred outcome is based on the impact analysis of the adjusted one or more data values; and automatically sending the updated dataset to the remote computing device to apply the updated dataset to a client dataset, wherein the method is performed by at least one processor.

In a further embodiment, a non-transitory computer storage medium storing computer-executable instructions is disclosed. The computer-executable instructions that, when executed by a processor, can cause the processor to perform the following method: accessing an electronic dataset which: (a) comprises data for plurality of data items including data management data, and (b) is related to a first electronic entity identifier; accessing data items by segmenting the data items using user-selected segmentation criteria resulting in analytic segments; for one or more analytic segments: extracting segment specific data from the dataset; calculating a plurality of performance metrics by generating one or more value driver data points using the extracted segment specific data; accessing an indication of a selected value driver to use for clustering; applying a clustering algorithm to the one or more value driver data points using the selected value drivers to generate clusters of behavior groupings that share similar value driver data points; determining a selected set of data items associated with one or more segments related to the first electronic entity identifier; determining a strategy related to the first electronic entity identifier, wherein the strategy is selected by the user or is determined by user-selected criteria based on objectives of strategy metrics; extracting data related to records for the selected set of data items within the dataset; executing an adjustment routine that adjusts one or more data values within the extracted data, wherein the adjustment routine includes: automatically adjusting the one or more data values using a set of executable rules; determining a baseline forecast over a baseline time period, projected forecast over a projection time period, or one or more seasonality factors associated with the selected set of data items based on the extracted data; and performing an impact analysis based on the baseline forecast, the projected forecast, or the one or more seasonality factors to forecast the impact of the adjusted one or more data values to generate a first set of resulting objective measurements; generating an updated dataset associated with a preferred outcome including the adjusted one or more data values, wherein the preferred outcome is based on the impact analysis of the adjusted one or more data values; and automatically sending the updated dataset to the remote computing device to apply the updated dataset to a client dataset.

BRIEF DESCRIPTION OF DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

FIG. 2 is a block diagram illustrating an embodiment of a process for an optimization and management system.

FIG. 3 is a block diagram illustrating an embodiment of a process of pre-clustering analysis.

FIG. 7 is a table illustrating an embodiment of product segmentation with a summary of extracted data.

FIG. 8 is a table illustrating an embodiment of product segmentation with value drivers.

FIGS. 15, 16, 17, and 18 are embodiments of electronic displays showing interfaces for an optimization and management system.

DESCRIPTION OF VARIOUS EMBODIMENTS

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

I. Overview

Embodiments of an architecture for electronic data optimization and management are disclosed. The architecture may include an optimization and management system that accesses extracted data from a large-scale data set to automatically develop adjusted data values based on a selection of a preferred outcome tied to forecasts which are based on the adjusted data values. In order to improve the accuracy of the forecasts, embodiments of the optimization and management system may divide the large set of extracted data into analytic segments, calculates standardized value drivers for each of the analytic segments to create clusters of behavior groupings within each analytic segment, generate potential adjusted data values specific to the behavior groupings, and generate forecasts for each of the behavior groupings. An updated data set with a selected set of adjusted data values based on the selected preferred outcome may be provided to a third party for integration into the third party's dataset.

II. Optimization and Management System

Figure 1:
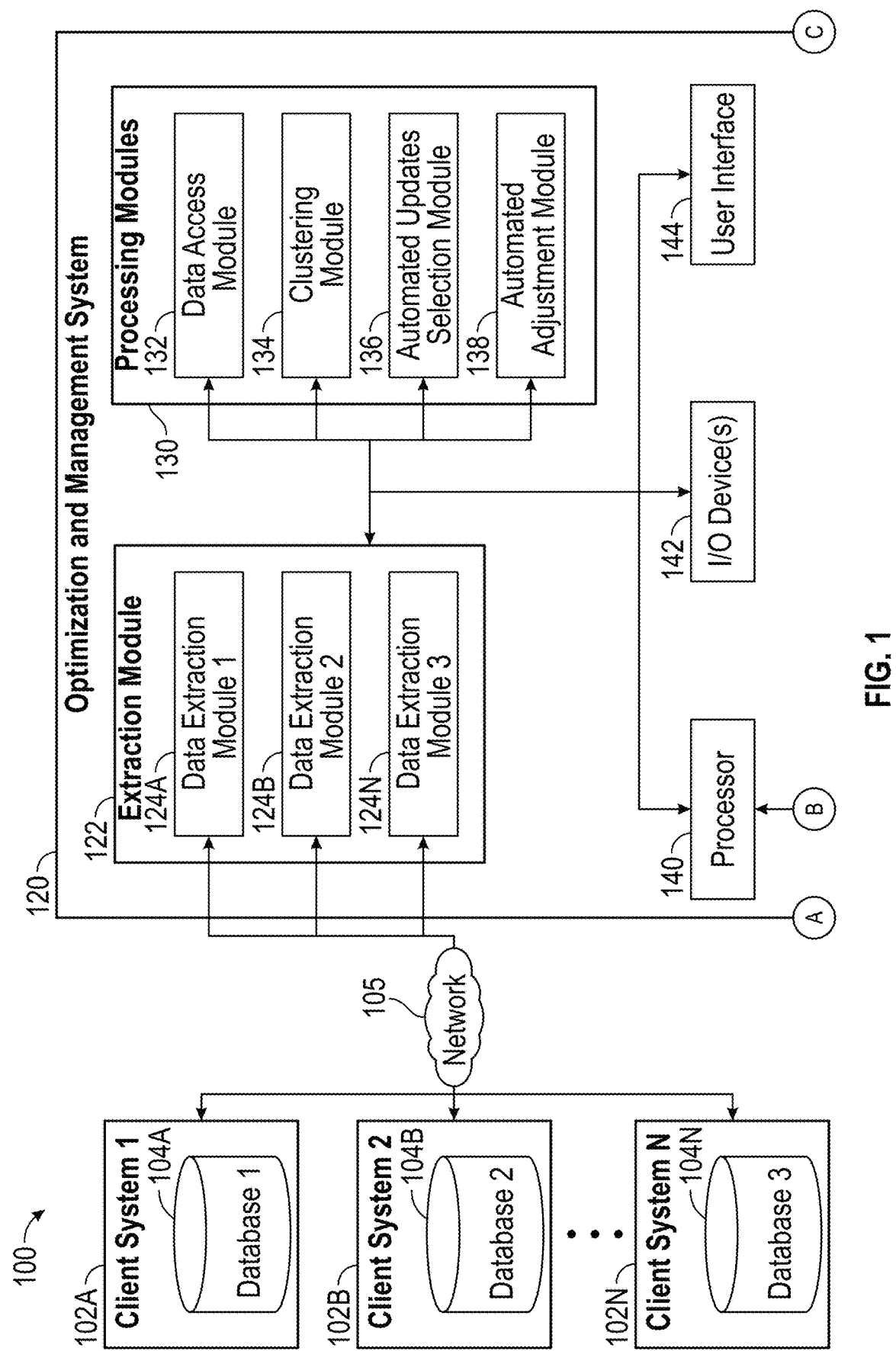
FIG. 1 is an overall system diagram depicting one embodiment of an architecture for an optimization and management system.
Figure 1:
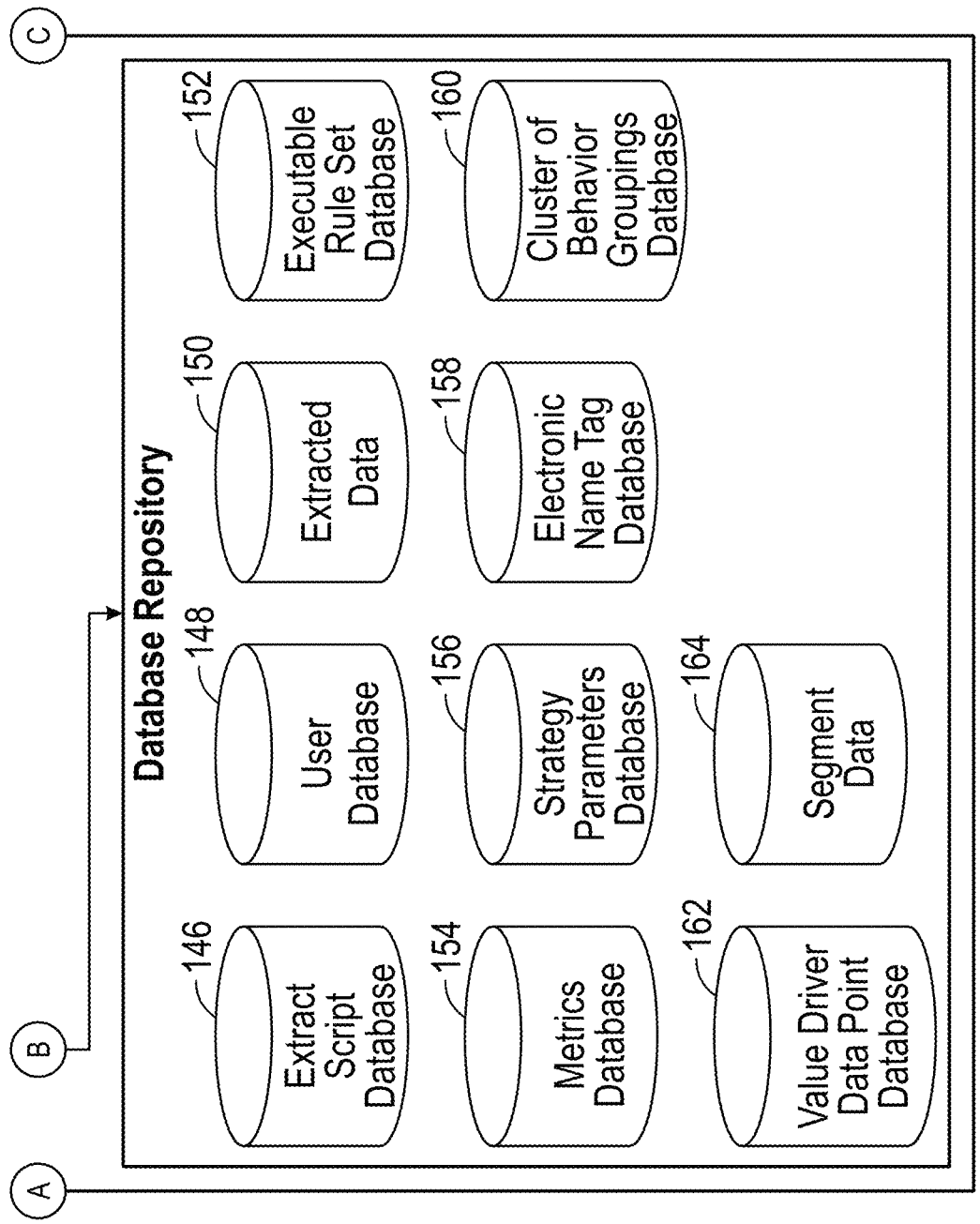

FIG. 1 is an overall system diagram depicting one embodiment of an architecture 100 for an optimization and management system. The architecture 100 shown in FIG. 1 includes client system 1 102A, client system 2 102B, and client system N 102N (collectively referred to herein as client systems 102), each including a client database 104A, 104B, 104C which can store client data, a network 105, and the optimization and management system 120. In one embodiment, the systems may communicate via one or more networks 105, which may include one or more of a local area network, a wide area network, the Internet, or a cloud-computing network, implemented via a wired, wireless, or combination of wired and wireless communication links.

A. Extraction Modules

The optimization and management system 120 shown in FIG. 1 includes an extraction module 112. The extraction module 112 may include a data extraction module 1 124A, data extraction module 2 124B, and data extraction module N 124N (collectively referred to herein as data extraction modules 124). The data extraction modules 124 can communicate with the client systems 102 via the network 105.

In some embodiments, the data extraction modules 124 can generate extract processes, such as, for example, mapping client data to data requirements selected by the client and data requirements provided by the optimization and management system 120, generating extract instructions, programs, routines, or scripts that will extract the needed data, and storing the extract instructions, programs, routines, or scripts in the optimization and management system 120 and/or the respective client system 102.

In some embodiments, the data extraction modules 124 may also initiate the execution of the extract processes, such as, for example, accessing the stored extract instructions, programs, routines, or scripts from the optimization and management system 120 and/or the respective client systems 102, and then executing the extract instructions, programs, routines, or scripts. In other embodiments, the client systems 102 run the extract instructions, programs, routines, or scripts.

In some embodiments, the data extraction modules 122 receive In some embodiments, the data extraction modules 122 receive the client data from the client systems 102, such as, for example, via an automated feed, from an FTP site, and so forth.

In some embodiments, the data extraction modules 124 perform translation processes, such as translations or data scrubbing routines on the received data to transform the client's data files into data and formats that can be processed by the optimization and management system 120. Due to the potentially large size of the client's data files, the data extraction modules 124 may implement pipeline routines and well as parallel processes to assist with processing the data files in a more efficient manner. It is recognized that the translation processes may be different for one or more clients.

In some embodiments, the data extraction modules 124 may also receive other data from other systems of the client or from third party systems.

B. Processing Modules

The optimization and management system 120 shown in FIG. 1 also includes processing modules 130. The illustrated processing modules 130 include a data access module 132, a clustering module 134, an automated updates selection module 136, and an automated adjustment module 138.

In some embodiments, the data access module 132 incudes modules for interfacing with the extraction module to receive the data from the client systems in a format which can be processed by the optimization and management system 120.

In some embodiments, the clustering module 134 pre-processes the client's data files to get the data ready for analysis by the optimization and management system 120. Such pre-processing may be beneficial in view of the large data sets and the disparity among the data values within the data sets. For example, the clustering module 134 may divide the data into analytic segments, calculate value drivers with each segment using the client data from each segment, standardize the value drivers within each segment into comparable categories, apply clustering algorithms to the standardized value driver data within each segment using selected characteristics to identify discrete behavior groupings, and then automatically name each of the discrete behavior groupings based on key characteristics. FIG. 3 illustrates an example process for the pre-processing.

Figure 4:
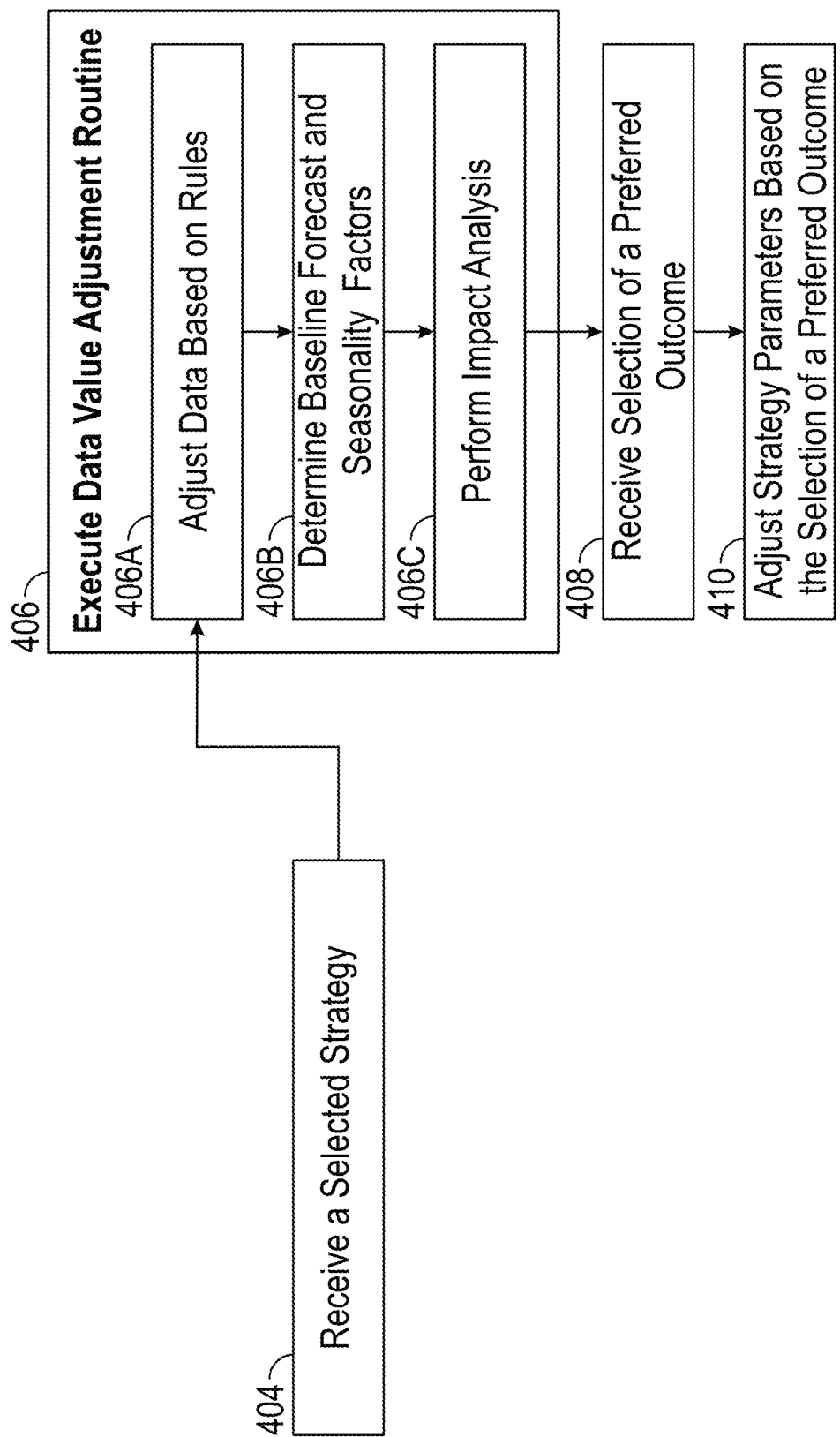
FIG. 4 is a block diagram illustrating an embodiment of a process for automated updates selection.

In some embodiments, the automated updates selection module 136 is employed to adjust one or more parameters within one or more selected clusters based on a selected strategies or objectives. The automated updates selection module 136 receives an indication, such as based on a client's selection, of a behavior grouping to analyze as well as the selected parameter(s) and then generates new values for the selected parameter(s). The automated updates selection module 136 can then apply one more forecast models to predict or forecast the impact of the calculated values on a set of selected metrics. It is recognized that the set of metrics may include, for example, actual or baseline metrics calculated for the baseline period based on historical data, projected metrics calculated for the projection period based on the current value of the selected parameter(s) and a forecast, as well as impact metrics which is calculated for the projection period using the same forecast but with the calculated values. For the impact metrics, the automated updates selection module 136 may also make adjustments to the forecast using one or more additional factors. The automated updates selection module 136 may generate multiple sets of metrics using different selected strategies, objectives, or combinations thereof. The automated updates selection module 136 may then generate a graphical representation of the multiple sets of metrics to allow a client to select one to apply. FIG. 4 illustrates an example process for performing automated updates selection.

Figure 5:
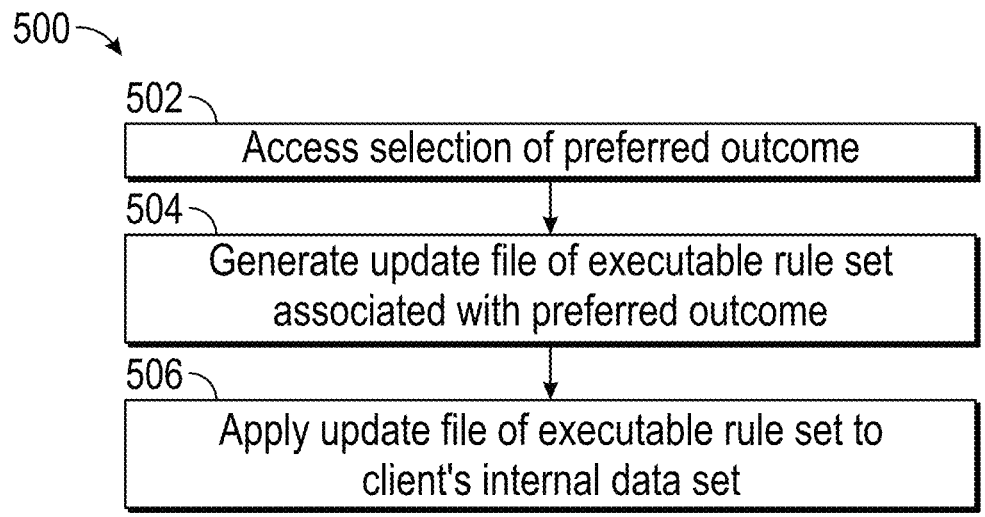
FIG. 5 is a block diagram illustrating an embodiment of a process for automated adjustment.

In some embodiments, the automated adjustment module 138 receives an indication of the selected set of metrics and then generates the updates needed to integrate the calculated values associated with the selected set of metrics within the client's data set. For example, the automated adjustment module 138 can also generate an executable rule set that when applied against the client's data set updates the appropriate values to be the calculated values. The automated adjustment module 138 can apply and/or cause the application of the executable rule set to a client's internal data set to automatically adjust a characteristic based on the application of the executable rule set. As another example, the automated adjustment module 138 can create a revised data set with the calculated values and send them to the client to replace those data fields with the calculated values and/or to cause a process or program to perform the replacement of those data fields with the calculated values. FIG. 5 illustrates an example process for performing automated adjustments.

C. Other Modules

The optimization and management system 120 shown in FIG. 1 also includes a processor 140, I/O device(s) 142, and a user interface 144 The processor 140 can electronically communicate with the extraction module 122 and the processing modules 130 to execute relevant modules for the optimization and management system 120. The I/O device (s) 142 can receive input and output from the client systems 102. The user interface 144 can interface with administrators, users, and/or clients of optimization and management system 120, for example to display relevant data and/or transmit display data to the client systems 102 for display to a user.

D. Databases

The optimization and management system 120 shown in FIG. 1 includes several databases which are stored internally within or accessed by the optimization and management system 120. The illustrated optimization and management system 120 includes an extract script database 146, a user database 148, an extracted data database 150, an executable rule set database 152, a metrics database 154, a strategy parameters database 156, an optional electronic name tag database 158, a cluster of behavior groupings database 160, a value driver data point database 162, and a segment database 164.

The illustrated extract script database 146 includes a data store configured to store extract scripts to be used by the extraction modules 122.

The illustrated extracted data database 150 includes a data store configured to store a local copy of the extracted data from the client's system, which may include the extracted data pulled from the client's system and/or the transformed data which can be processed by the optimization and management system 120.

The illustrated segment database 164 includes a data store configured to store the sets of segments for each the clients. The value driver data point database 162 includes a data store configured to store value drivers that correspond to each of the client's data sets.

The illustrated cluster of behavior groupings database 160 includes a data store configured to store the clusters created by the clustering process, though it is recognized that in some embodiments, the clusters can be represented in other databases, such as the extracted data database 150 via the use of a tag, field, or indicator that denotes the cluster to which the data is assigned.

The optional electronic name tag database 158 includes a data store configured to store names assigned to the clusters which may represent a behavior. However, it is recognized that in other embodiments, the names assigned to the clusters may be stored in another data store, such as, for example the cluster of behavior groupings database 160.

The illustrated metrics database 154 includes a data store configured to store data regarding the metrics, such as, for example, the actual or baseline metrics, the project metrics, as well as the impact metrics. This data may include, definitions or parameters (such as for example, number of months in the baseline period, number of months in the projection period, algorithms for calculating a forecast) for calculating such metrics from the optimization and management system 120 and/or from the client. The metrics database 154 may also include a copy of the calculated metrics though it is recognized that in some embodiments, the metrics may be stored in other databases, such as, for example the cluster of behavior groupings database 160. The metrics database 154 may also store data regarding other factors used to calculate the metrics, such as, for example, seasonality data, macroeconomic data, competitive sensitivity data, cannibalization data, halo data, elasticity of demand data, and so forth.

The illustrated strategy parameters database 156 includes a data store configured to store strategy parameters that may be used to calculate the metrics and may be client-specific. In some embodiments, the strategy parameters database 156 includes default strategy parameters and/or objectives which can be presented to a user for utilizing for the metric calculations, while in other embodiments, the strategy parameters and/or other objectives are defined by a user.

The illustrated executable rule set database 152 includes a data store configured to store executable rule sets, instructions, or updated datasets generated by the optimization and management system 120 to be deployed to and/or integrated into the client systems 102 for automatic adjustment of strategy parameters.

The illustrated user database 148 includes a data store configured to store data related to the users of the client systems 102 and/or remote computing devices communicating with the client systems 102. Such users may include administrators, users, and clients of the optimization and management system 120.

While a variety of databases are included in the embodiment of FIG. 1, it is recognized that one or more of the databases may be combined, divided, and/or deleted. In addition, subsets of data from one database may be stored in another database as a duplicate copy or as the sole copy. Further, portions or all of one or more of the databases may be stored in a cloud, stored remote from the optimization and management system 120, and/or stored in a distributed system, such as a blockchain or linked ledger.

III. Optimization and Management Processes

FIGS. 2, 3, 4, 5, and 6 are flowcharts illustrating various embodiments of optimization and management processes that execute within the computing environment. In some embodiments, the processes are performed by the optimization and management system 120 and/or by one of its components. However, it is recognized that other components of other systems (not shown) may perform one or more of the processes. For ease of explanation, the following describes the services as performed by optimization and management system 120. The example scenarios are intended to illustrate, but not to limit, various aspects of the computing environment. In some embodiments, the processes can vary from the example flowcharts, with some blocks omitted and other added.

A. Optimization Process

FIG. 2 is a block diagram illustrating an embodiment of a process 200 for the optimization and management system. At block 202, the process 200 performs pre-clustering on the client's data. The pre-clustering can include accessing the client's dataset and determining segments of the data based on analytic segments selected by or approved by the client. The process 200 can calculate performance metrics by generating value driver data points. The value driver data points can be standardized and clustered based on behavioral groupings. The process 200 can then assign electronic name tags for each of the clusters of behavior groupings. FIG. 3 includes an example process for pre-clustering the data set.

At block 204, the process 200 selects automated updates. The process 200 can receive the clusters of behavioral groupings that share similar value driver data point values. The process can determine and/or receive a selected strategy and access relevant data from the extracted dataset. The process 200 can execute a adjusted data parameter routine on the extracted dataset by adjusting data based on rules, determine a baseline forecast, a projected forecast, and seasonality factors, and perform impact analysis to determine outcomes and/or preferred outcomes. Based on a selected outcome, for example by a user or automatically, the process 200 can adjust strategy parameters on the outcome. FIG. 4 includes an example process for providing automated adjustments for selection. In some embodiments, the example process is performed on batch processing. In alternative embodiments, the example process is performed in real-time.

At block 206, the process 200 generates a set of client-related data that includes the adjusted parameter(s). In some embodiments, the process can execute instructions to install the adjusted parameter data in the client's database, cause automatic adjustment of the strategy parameters on the user's internal client database, and/or generate an encrypted data packet message letting the client system know that the data is available to load. In some embodiments, the process can access the selection of the preferred outcome from block 204 and generate an adjusted parameters file associated with the preferred outcome. FIG. 5 includes an example process for providing automated adjustments.

B. Pre-Clustering Process

FIG. 3 is a block diagram illustrating an embodiment of a process 300 for pre-clustering analysis of client data. At block 302, the process 300 can access the client's dataset. For example, the process can use the extraction modules 122 of the optimization and management system 120 of FIG. 1 to extract data from the client systems 102, or the process can access extracted data from the client's system 102.

At block 304, the process can access analytic segments associated with the client. In some embodiments, the optimization and management system can determine the segments. The analytic segments can include calculations of comparable performance metrics for a set of data so that their behavior can be characterized within each segment. In some embodiments, the optimization and management system 120 can receive a user selection of segment definitions that divide the data into groups. In some embodiments, the process automatically generates segments by dividing client data into segments by flagging data which indicates shared common traits among various characteristics.

At block 306, the process 300 extracts segment specific data from the extracted dataset. The segment specific data can include identifying relevant data from the extracted dataset for each segment. In some embodiments, the extraction module 122 can extract data specific to one or more segments.

At block 308, the process 300 can calculate value driver data points on the extracted segment-specific data. The value drivers can include a translation of a behavior metric into a value driver within the context of its segment. For example, the value drivers are calculated from the extracted data for each segment, but can also be calculated across more than one segment and/or across all segments. In some embodiments, the value drivers can be calculated for each segment.

At block 310, the process can execute a standardization algorithm using value driver data points to generate encoded value driver data points. Since the range for value drivers can be different across segments, the standardization algorithm can standardize the value drivers into a comparable categories. One example of a standardization algorithm includes the use of extracted values and encoding parameters:

Encoded Value=$f(r,EP)$ $F:R\rightarrow[0,1]$ can represent an encoding function, r can represent a extracted value of the value driver, and EP can represent encoding parameters. In some embodiments, the system can automate a search for appropriate function (f) and parameter values (EP) for each value driver within each segment to disregard outliers and/or find a desired distribution, such as the distribution of specific parameters.

In some embodiments, the standardization uses an Euclidean distance measurement function:

min:$g(f,EP|R,p^*)$

G can represent a Euclidean distance between p(EP, R) and p*, p(EP,R) can represent a resulting distribution of specific parameters given a set of encoding parameters EP, R can represent a set of extracted values for the value driver in the segment {r1, r2, r3, . . . rN}, and p* can represent a desired distribution, such as 5 groups with data value >X % each.

Each segment may provide a platform for metric standardization. By using the distribution of values for each metric, the system can identify an indication of value, such as a low range versus a high range within or among segments such that data across segments can be compared to each other using the standardized values for each metric. This measurement system allows for differentiation of performance within and across segments. These encoded metric values may be automated and stored for use by other steps in the system and/or process.

At block 312, the process 300 provides a listing of value drivers to use for clustering and receives a selection of value drivers to use for the clustering. The selection can be automatic by the optimization and management system and/or received from a user.

At block 314, the process 300 applies one or more clustering algorithms to the encoded value driver data points and the selected value drivers to generate clusters of behavior groupings within each segment. These clusters group data items with similar behavior. Similarity of behavior may be determined based on distance measurements between data items using their encoded metrics. Data items which similar value driver values are considered to have similar behavior. By implementing a clustering algorithm using the encoded value drivers, the data items can be grouped by commonality in the encoded value drivers.

Commonality can be determined and/or defined based on how close each data item within the segment is to a cluster center. Each data item can be assigned to the cluster that it is closest to in distance. There are many distance measurements that can be used which render different groupings. Some non-limiting example distance measurement functions that can be used are:

Euclidean $d(x, y) = \sqrt{(x1 - y1)^2 + (x2 - y2)^2 + \ldots + (x1 - y1)^2}$

-continued $$\text{Minkowski } d(x, y) = \left[ \sum_{i=1}^{p} |x_i - y_i|^m \right]^{1/m}$$

$$\text{Canberra } d(x, y) = \sum_{i=1}^{p} \frac{|x_i - y_i|}{(x_i - y_i)}$$

$$\text{Csekanowski } d(x, y) = 1 - \frac{2 \sum_{i=1}^{p} \min(x_i, y_i)}{\sum_{i=1}^{p} (x_i + y_i)}$$

In one embodiment, two levels of clustering are used. The first level clustering can define behaviors based on the data item-level metrics selected for that purpose. A second level of clustering can be used to subdivide behaviors into other segments using a potentially different set of metrics.

After clusters are generated, in some embodiments, the process 300 assigns one or more unique identifiers and/or electronic name tags to each of the cluster of behavior groups. The electronic name tags can be associated with a determined characteristic for the cluster. For example, a statistical difference of means test on each value driver can be applied by comparing data items within a cluster to all other data items. The value drivers that show significant differences can be stored. The level within the value driver domain (for example, lowest, low, average, high, highest) can be used to characterize the cluster. A measure of variance in the value drivers can be used to determine the range of levels that characterize the group, such as low to medium, high, medium to highest, and/or the like. Each distinct set of significant characteristics can be stored, such as data items with highest value X, but low value Y, or data items with high value Y, but low to medium value Z.

C. Automated Adjustments Process

FIG. 4 is a block diagram illustrating an embodiment of a process 400 for automated adjustments selection.

At block 404, the process determines a strategy for each cluster of behavior groupings, where the strategy can be selected by the user or can be determined by user-selected criteria based on objectives of the performance metrics. In some embodiments, the process may be performed for a subset of the entire group of clusters. In some embodiments, the optimization and management system 120 can provide graphical user interface data to a client device to configure the strategy manually and/or the optimization and management system 120 can provide a strategy optimization wizard that uses a mathematical model, default values, or other methods to recommend a strategy.

In some embodiments, the selected strategy can include a business objective. The optimization and management system 120 and/or users can define the business objectives that will drive the optimization algorithm for each behavior cluster. Business objectives can be stated by the user as either a maximization, minimization or target value for the change in a particular data field, such as but not limited to "Maximize change in X", "Minimize change in Y", "Target a 2% increase in Z."

At block 406, the process 400 executes a data value adjustment routine. The data value adjustment routine can include process steps that change a characteristic of the data items. For example, the data value adjustment routine can generate recommended changes for data value X. The user and/or the optimization and management system 120 can select data items and/or groups of data items to target for changes. For example, the user can select a segment and/or a cluster to filter data items for recommended changes.

At block 406a, the process 400 can initiate a data value adjustment routine by adjusting data based on certain rules associated with the selected strategy. In some embodiments, a new data value calculation function can be used that calculated a recommended updated data value. The new updated data value calculation function can be based on a data item's current data value, current value drivers, and/or a selected strategy:

New Data Value $f$(existing data value,$Vi,Pj$)

The existing data value can represent the current data value of the data item, Vi can represent an encoded value driver for the data item, and Pj can represent a strategy parameter that defines how each of the encoded value drivers affect the change in existing data value.

At block 406b, the process 400 can determine baseline forecast and seasonality factors. For example, the baseline forecast and seasonality factors can be based on historical data, such as historical client data.

At block 406c, the process 400 perform an impact analysis. For example, given a set of new data values and both a baseline time period and a projection time period, the process 400 may forecast the impact of the new data values in terms of metrics. The process may forecast the impact of the new data values by determining a projected forecast based on the baseline forecast and/or seasonality factors.

In some embodiments the metrics for the impact analysis may be calculated for three different contexts:
  Actual/Baseline metrics—calculated for the baseline period based on historical data
  Projected metrics—calculated for the projection period based on current data values for the selected parameter and a forecast which may be a function of data item level trend and seasonality; and/or
  Impact metrics—calculated for the projection period based using the same forecast but with the updated data values for the selected parameter and the effect the updated data values will have, where one or more factors may be used to influence impact.

In some embodiments, parameter changes are determined by using an impact analysis model to estimate the impact of the data value changes. This forecast can be calculated at the data items level and aggregated for all data items within each behavior.

In some embodiments, the impact analysis model is calculated using time series analysis which selects one of many impact analysis models that use one or more input time series of various data values for the data items. The models can be validated by attempting to forecast the most recent year of data and using the forecasting error to determine accuracy. A final impact analysis model can be selected by comparing model accuracies and selecting the simplest of the more accurate model options. Since this process is done periodically, impact analysis model selection can adapt to changes in the data item lifecycle and other changes.

At block 408, the process 400 can receive a selection of a preferred outcome. For example, the selection can be based on optimization of the strategy by finding the segment change values that help achieve the business objectives defined for the each behavior cluster.

In some embodiments, the results of the impact analysis model can be used to calculate the expected business objective results. The optimization algorithm can evaluate multiple possible solutions by evaluating the impact to the business objectives given the parameter changes that make up a given solution. The performance impact analysis model can be used to estimate future performance units based on the proposed changes in the solution along with their sensitivity to other factors.

In some embodiments, a mathematical optimization model can be used based on business objectives expressed as a minimization, maximization, or target for any of the Impact Analysis change metrics.

In some embodiments, multiple objectives may be used and the system can find the Pareto solution set such that the user is presented with the combinations of objectives outcomes to select from. Non-limiting examples include:

Objective #1=+2%, Objective #2: +1.5%, Objective #3: −0.2%
Objective #1=+1%, Objective #2: +2.0%, Objective #3: −1.5%
Objective #1=+0.5%, Objective #2: +1.0%, Objective #3: −1.8%

In some embodiments, the optimization engine takes a data value adjustment routine with its strategy, its set of rules and an impact analysis configuration to determine which strategy parameter settings best meet the business objectives defined. Each resulting solution can provide the objective values it achieves and the strategy parameters it used to achieve them. The user can then select a solution to apply and it replaces the current strategy parameters.

At block 410, the process 400 adjusts strategy parameters based on the selection of a preferred outcome. For example, the process 400 can adjust the strategy parameters that define the segment change function.

In some embodiments, the optimization and management system can generate the adjusted data values of a client dataset on a server remote from the client system and/or the client's dataset. The optimization and management system can apply a certain arrangement of processes on the server side remote from the client system, where such processes may include determining standardized value drivers, applying a clustering algorithm to generate clusters of behavior groupings, performing an impact analysis based on determined baseline forecasts, projected forecasts, and/or seasonality factors, and/or the like. Further, the optimization and management system can generate an executable instruction set that can be delivered to the client system to automatically adjust and/or automatically cause the adjustment of or updating of data values in the client dataset corresponding to the preferred outcome. Accordingly, the one or more processes can be used to update the client system and/or data set but can be performed on the server system without being dependent on the hardware, operating system, and/or software of a client computing device and does not require the client computing device to need large network throughput and high processing speed to generate such adjustments.

D. Automated Updates Process

FIG. 5 is a block diagram illustrating an embodiment of a process 500 for automated adjustment. At block 502, the process 500 can access the selection of the preferred outcome. For example, the selection of the preferred outcome can be determined at block 416 in process 400.

At block 504, the process 500 can generate an updated data set or executable rule set associated with the preferred outcome. At block 506, the process 500 can integrated the updated data set or apply the executable rule set to the user's internal client database. For example, the process 500 can transmit the updated data set to a client device to be used to update the client's database.

At block 508, the process can automatically adjust parameters based on the application of the updated data set or the executable rule set. For example, the process 500 can update or calculate parameters for the base level, cascade to other parameter levels, and/or apply parameter rules to render final parameters. The system can recalculate the business goal impact and/or continues to adjust the change parameters until it converges on the best outcome for either the business goal or in the case of multiple goals, a list of outcomes in which the user is presented with a variety of goal attainment possibilities and allowed to select which one to use.

The updated data set and/or executable rule set can be automated, and/or the executable rule set that can include performance-based parameter optimization and impact analysis can be made available for editing by the user. Warnings, such as, for example, exceeding pre-defined limits may be available to the user for edit and correction.

In some embodiments, the optimization and management system can apply a certain arrangement of processes to generate an enhanced extracted dataset. In some embodiments, a set of executable instructions can be generated and deployed to a client computing device to automatically adjust the data values based on the selected preferred outcome. Thus, the dataset that was previously stored within the client system can be automatically enhanced by the set of executable instructions to provide an output that is optimized and/or configured according to the preferred outcome. Thus, client computing devices can perform deployment of the set of executable instructions providing more flexibility in updating large datasets storing disparate data.

In some embodiments, the executable instruction set can delivered in the form of an update and/or a downloadable file such that the executable instruction set can be downloaded and performed on the client computing device, separate from the optimization and management system, and executed locally on the client computing device. Such local processing may enable faster updates and may reduce network throughput by reducing and/or eliminating communications with the optimization and management system.

E. Extract Process

Figure 6:
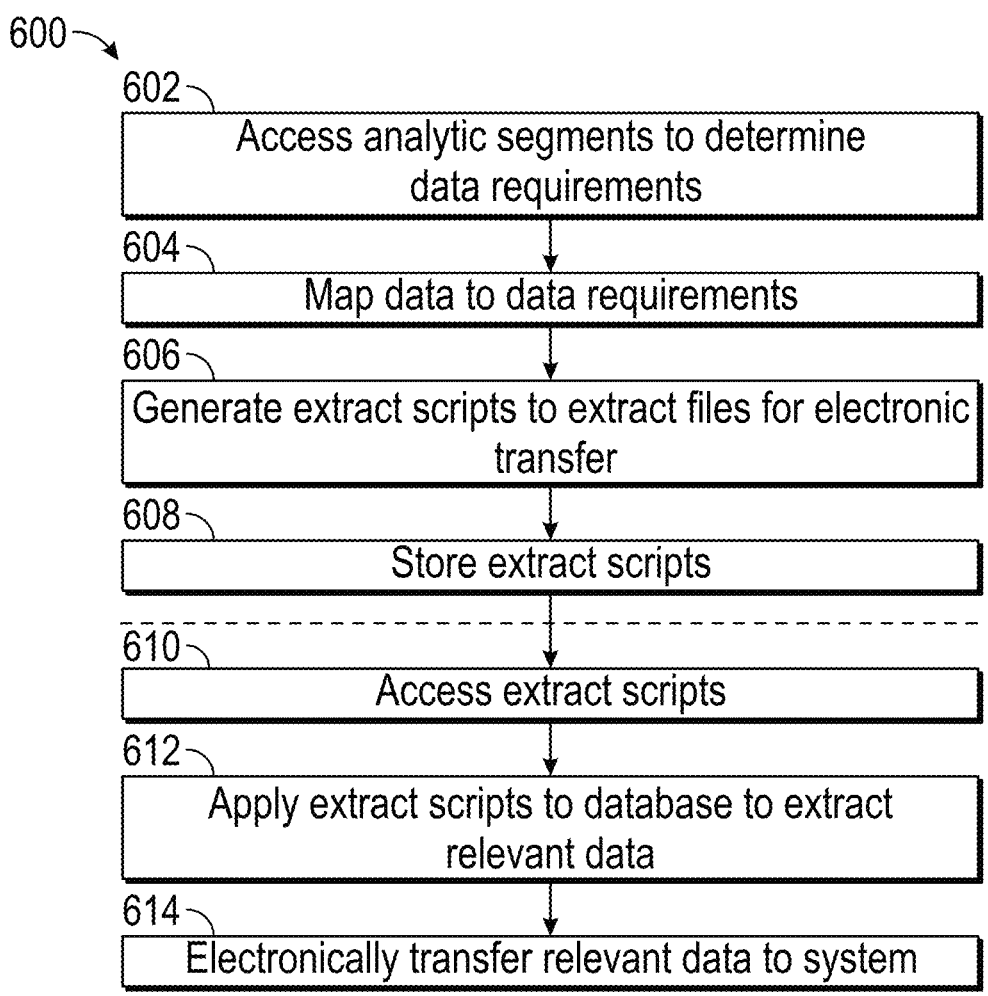
FIG. 6 is a block diagram illustrating an embodiment of a process for generating and executing extract scripts.

FIG. 6 is a block diagram illustrating an embodiment of a process 600 for generating and executing extract scripts to extract files from the client database. At block 602, the process 600 can access analytic segments to determine data requirements.

At block 604, the process 600 can map the client data to data requirements provided by the system and/or the client. At block 606, the process can generate extract scripts or other instructions for extracting data electronic transfer, and at block 608, the process can store extracted scripts. For example, the process 600 can generate extract data files for automated data extraction that significantly eases implementation time and effort.

At block 610, the process 600 can access extract scripts, and at block 612, the process can apply extracted scripts to the client's database to extract relevant data. Given the data connector and file-based data loading, data from any third party system can be leveraged by the disclosed system. At block 614, the process 600 can electronically transfer relevant extracted data to the system.

IV. Example Applications

It is recognized that embodiments of the architecture 100 for an optimization and management system 120 may be used for a variety of applications that are trying to provide forecasts and recommended changes for large data sets which represent a diverse population.

One example application is for adjusting the pricing of products, which can affect sales, margins, a markup/markdown influence factor, and/or the like. Another example application is to determine rent for tenants, which can affect vacancy rates and be based on demographic data, location, and/or the like. Other example applications include power management systems, education system tracking, investment systems, and so forth.

As an example application, pricing and inventory systems will be discussed in more detail herein to illustrate how the architecture 100 may be used to provide recommended pricing adjustments for hundreds of thousands of disparate products. However, it is recognized that the architecture 100 is not limited to any specific application and that the optimization and management system can be applied in other applications.

V. Product Performance-Based Price Optimization and Management

Features are now described for embodiments of a product performance-based system that helps retailers and distributors manage prices and inventory more effectively. The system may utilize client data, such as enterprise resource planning (ERP) data, to develop and recommend pricing options in order to achieve strategic corporate objectives. A product's behavior may be represented by a set of metrics that characterize different aspects of its performance. Embodiments of the system offer solutions that sources existing enterprise data into an analytic data model, whereby products are segmented and grouped based on performance metrics to then calculate recommended or potential price changes that align with designated corporate objectives such as, for example, gross profit, balanced inventories, competitive prices, and/or other target objectives. As new prices are implemented, the system can retain the basis for price changes, comparing future performance to forecast parameters. In this manner, pricing decisions can be analyzed and improved over time.

This disclosure includes embodiments for a product performance-based pricing optimization and management system. To effectively price an item within an enterprise, pricing analysts and managers generally take into account a broad range of performance factors. Prices are established first based on the value of the product to both the seller and consumer. After that value is established, prices are contrasted with specific, known competitors, as well as the market in general. Pricing products solely based on competitive forces can lead to a downward spiral into unprofitable business for both the seller and their competitors. Automated rules can be employed to maintain margins, as well as to round prices to perceived "charm" pricing amounts based on a broad range of case and/or action combinations. The complexity of such analytics is further compounded by the fact that different products or product segments, have different values, pricing, competitors, and corporate objectives. Further, some entities are managing hundreds of thousands of individual products.

In addition to pricing large volumes of products, many companies are faced with a multitude of price levels, or "price lists", one for each segment of their distribution network. Keeping price levels in line with the list or retail price changes can be an immense task for a pricing team. Tools are needed to manage and optimize price changes for segments of distribution, including volume-based discount levels. Retailers and distributors can leverage existing data to determine how customers value their products, and use metrics to drive every day and promotional prices.

Embodiments of the system may be referred to as a performance-based pricing optimization and management system, and its distinguishing features may include one or more of the following:

provides for quick installation, and can rapidly generate pricing recommendations for tens of thousands of product prices, leverages product performance metrics (both out-of-the-box and custom) to drive potential price changes, integrates and compares prices with select competitor and market data, and/or tracks and measures actual performance for each granular price change in order to allow for improvements in pricing strategies.

In some embodiments, the system utilizes an analytic methodology that can, in some embodiments, be performed in a repeatable software-driven methodology. The system generates a set of recommended price changes using data from the ERP systems. The term "performance-based" may include a pricing system that uses existing product metrics to determine product value to the business, followed by competitive performance analysis, and a forecast of price change impacts utilizing calculated price elasticity of demand, product seasonality, as well as halo, competitive sensitivity and cannibalization effects.

A. Example Process

The following provides embodiments of the optimization and management processed as applied to the product performance-based pricing application.

1. ERP Data Extract

In one embodiment, the first step is ERP data extraction. ERP data is mapped to data requirements, and extract data files are built and securely transferred to the system. For some well-known commercial ERP systems, automated data extraction significantly eases implementation time and effort. Given the data connector and file-based data loading, data from any ERP system can be leveraged by the disclosed system.

2. Calculating Performance Metrics

Next, comparable performance metrics can be calculated for a set of products (for example, all products or a group of products) so that their behavior can be characterized within each market.

In one embodiment, the process starts by dividing sales data into market segments. Each market segment may represent a group of sales transactions that share common traits among product characteristics, locations or regions, and/or customer characteristics. This segmentation is helpful for the system since the values of metrics can vary significantly from one market segment to another. The system allows the user to define market segments by dividing products into groups such that later, the pricing analyses and forecasting is specific to each market. Market segments can then be used to determine product performance using a host of behavior metrics such as, for example, sales rate, inventory on hand, and/or gross margin, among others.

FIG. 7 is a table illustrating an embodiment of example market segments created using category and distribution channel. The categories include toys, furniture and toys, and furniture and the distribution channels include retail stores (both online and stores), wholesalers, and distributers. of product segment and distribution channel defines a market segment. For example, one market segment is Toys/Retail.

As shown in the table, data for products within each of the market segments has been aggregated so that there is data provided for each market segment. The illustrated aggregated includes total dollar sales, number of sales units, and number of customers. For the market segment Toys/Retail, the total dollar sales is $5,000,000, the number of sales unit is 45,000, and the number of customers is 15,500.

Further, value drivers can be calculated for each market segment, which for pricing optimization may include value drives like sales rate, gross margin, days on hand, and so forth. FIG. 8 is a table illustrating an embodiment of calculated value drivers for sales rate and gross margin are calculated for the each market segments. For example, for the Toys/Retail category, the sales rate ranges between 0-250 units/month and the gross margin ranges between 20%-50%.

In some embodiments, a value driver for a group of market segments may be calculated. In the example of FIG. 8, the days on hand value driver is determined for each category for all of the distribution channels, such that for Toys, the days on hand ranges from 0-365 days.

3. Standardizing Metrics

Because the range of value drivers can be very different across market segments, the system preforms standardization processes so that they value drivers are put into comparable categories or ranges. As such, each market segment may provide a platform for metric standardization. By using the distribution of values for each metric, the system identifies what constitutes, for example, low versus high values within that market segment. Extracted metric values are encoded into a standard value range, such that products across market segments can be compared to each other using the standardized values for each metric. This measurement system allows for differentiation of product performance within and across market segments. These encoded metric values may be automated and stored for use by other steps in the system and/or process.

Figures 9A, 9B:
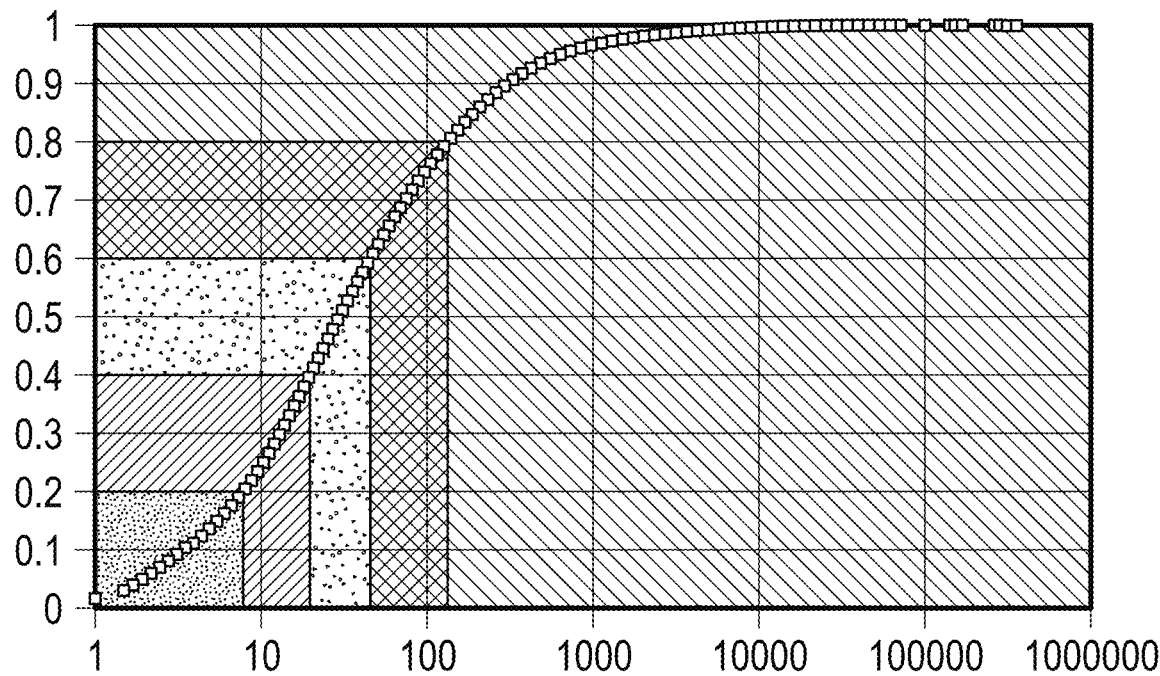
FIGS. 9A and 9B are illustrative embodiments of standardized value drivers.

FIGS. 9A and 9B are illustrative embodiments of standardized value drivers. FIG. 9A illustrates the days on hand value driver across for a given market segment. The days on hand value driver can include a range. The range for the example in FIG. 9A is from 0 (for example, for drop ship items where there is no inventory on hand) to 365,000 (for example, for some items with very high inventory levels and low sales velocity). The p* in this example is set to 5 groups with 20% of revenue each. The resulting function is:

$$f(r, EP) = \frac{1}{1 + e^{\frac{ln(EP_1) - ln(r)}{EP_2}}}$$

Where $EP_1$ is 30 and $EP_2$ is 0.462.

4. Clustering

After market segments are established and metrics are encoded within each segment, clustering algorithms may be employed in order to group products with similar behavior. Similarity of behavior may be determined based on distance measurements between products using their encoded metrics. Products that are close to each other are considered to have similar behavior. As noted above, there are many distance measurements that can be used which render different groupings and a variety of other distance measurements can be used.

Figure 10:
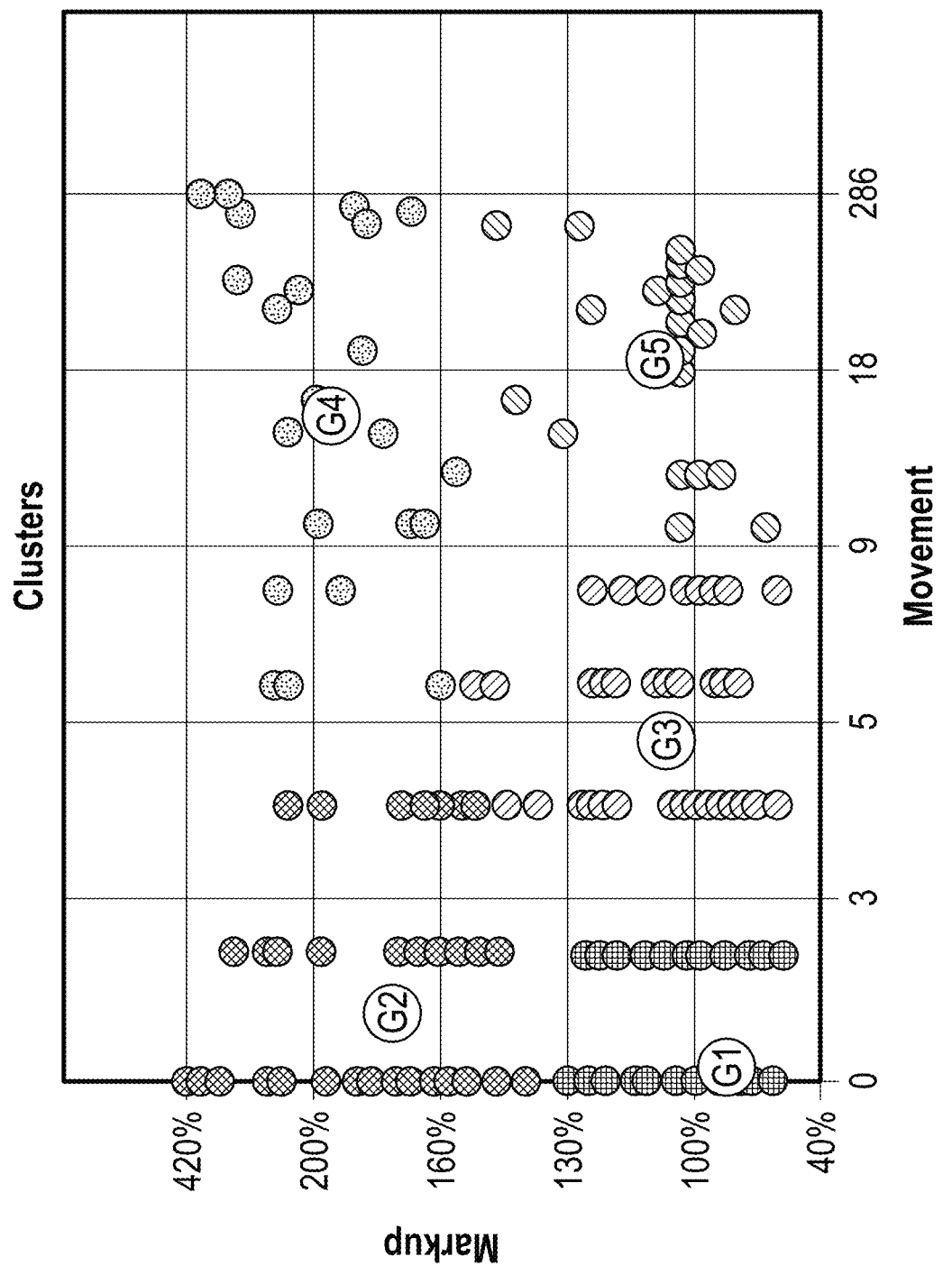
FIG. 10 is a graph illustrating an embodiment of an example of clusters of behavior groupings.

FIG. 10 is a graph illustrating an embodiment of an example of clusters of behavior groupings. A clustering technique can be used to find groups of products with common behaviors. The clustering technique can include a difference of means test to recognize key characteristics of each group. The optimization and management system can automatically name clusters of behavior groupings based on key characteristics. For example, in FIG. 10, the clusters are:

G1: "Lowest Movement, Lowest Markup"
G2: "Avg to Highest Markup, Low Mov."
G3: "Medium Mov., Low to Avg Markup"

In one embodiment of the solution, two levels of clustering are used. The first level clustering defines product behaviors based on the product level metrics selected for that purpose. A second level of clustering is used to subdivide product behaviors into pricing segments using a potentially different set of product metrics. For example, the first level clustering can include product behaviors segments and the second level of clustering can include pricing sub-segments. The first level of clustering can include a user selection of product metrics to use for product behavior segregation. The clustering algorithm can cluster products based on similarities and/or differences in values of the selected metrics. The clustering process can use a plurality of metrics. In FIG. 10 described further below, two metrics are used for clustering: markup and movement. In some embodiments, more or less metrics can be used.

The second level of clustering can include subdividing the product behavior segments into more granular subdivisions. The subdivisions can be used to drive price changes. The subdivision can be performed using one or more metrics. The one or more metrics can include the same metrics, a subset of the metrics, and/or different metrics than that for the product behavior segregation in the first level of clustering. The second level of clustering can create subgroups of products that share similar behavior at a more granular level. For example, the optimization algorithm can assign price changes to each pricing sub-segment such that collectively the sub-segments can forecast the business goals stated for the product behavior.

After clusters are built, users define the business objectives that will drive price change optimization algorithm for each product behavior cluster. Business objectives are stated by the user as either a maximization, minimization or target value for the change in sales and financial metrics, such as but not limited to "Maximize change in Revenue", "Minimize change in Total cost", "Target a 2% increase in Gross Margin" or "Maximize change in Unit Sales". The user may use one or more objectives for each product behavior or may choose to exclude a product behavior such that no price changes are generated for the products it contains.

5. Generate Pricing Solutions

A pricing solution is defined as a set of price changes or price change ranges represented as a percentage change from current price. A solution contains price change settings for each pricing segment contained in each product behavior. In some embodiments, adjusting the price can include a pricing solution with a set of price changes or price change ranges represented as a percentage change from current price. A solution can include price change settings for each pricing segment contained in each product behavior.

In some embodiments, the system also allows for the definition of global price change limits, so that regardless of the key value driver and influencer calculation results, price changes may be made to not surpass these upper and lower global price change limits.

In some embodiments, prices are calculated for the base price level (Key Price List) for products using the pricing strategy. A price level hierarchy is defined to cascade price changes to other price levels. Cascading can be set as a simple percent change from the parent level or can be set to maintain existing price ratio between parent and child price levels.

In some embodiments, after or before cascading, automated rules can be used to round prices to a "charm price", or limit price changes to respect minimum/maximum markup configurations or other pricing limits such as, for example, Minimum Advertised Prices or limits associated to competitor prices. The pricing rules can be any rules that adjust prices of products. For example, rules can be defined for each price list and applied to each product price after the new price calculation is performed. Non-limiting examples of rules include:

Conditional rule—checks if a price fits a particular condition and applies an price change action.

Price Range rule—applies a different action for each price range.

Conditional Price Range rule—is a Price Range rule that is only applied if the condition is met.

Figure 11:
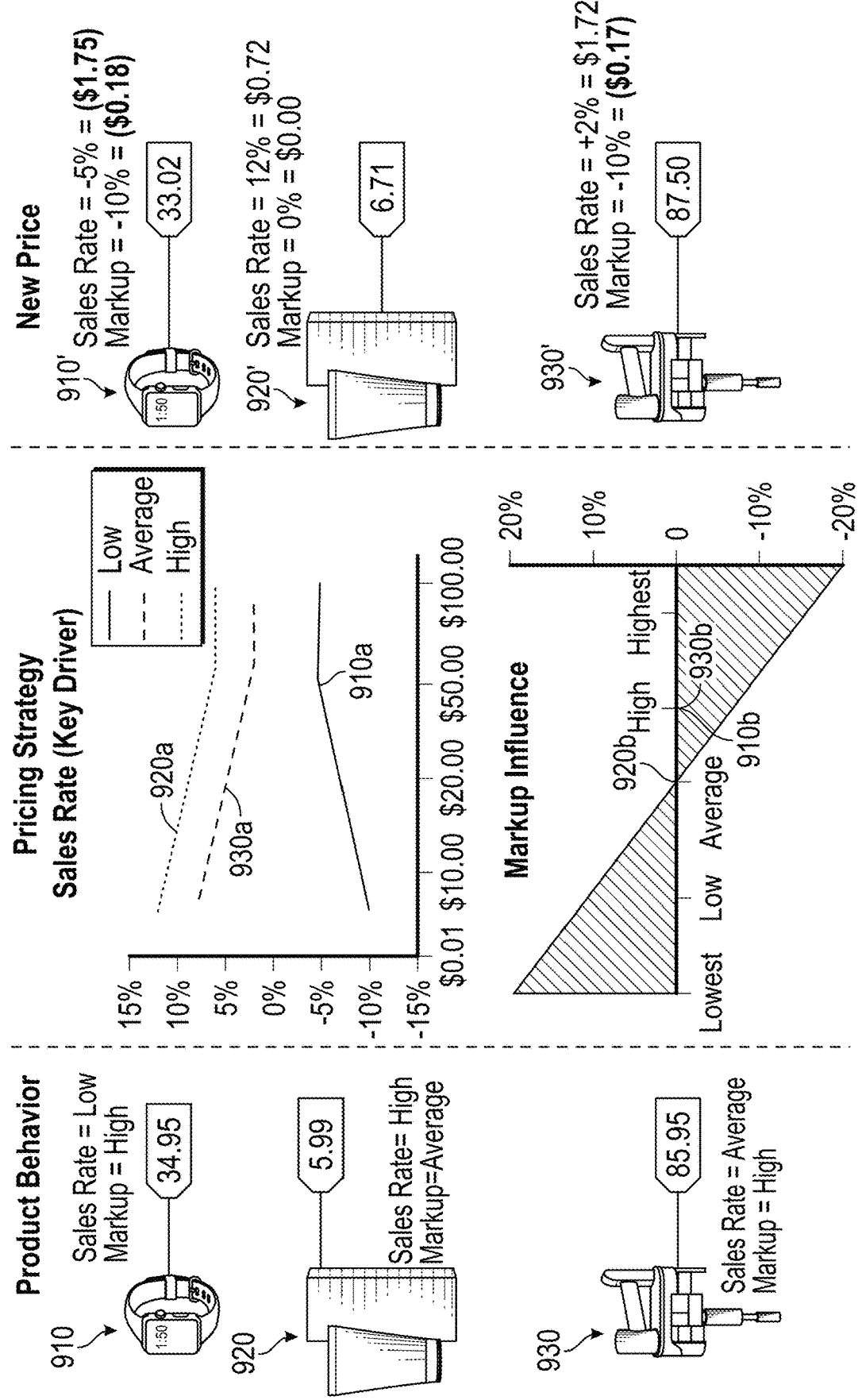
FIG. 11 is an example illustrating an embodiment of a pricing strategy.

FIG. 11 is an example illustrating a pricing solution or strategy applied to three products. The Product Behavior show three products, a watch, a glass, and a clamp along with their current prices, and their standardized value drivers, sales rate and markup. For example, for the watch, the current price is $34.95 with a low sales rate and high markup. The Pricing Strategy includes assessing sales rate as the key driver as well as the markup influence. The New Price then shows a potential change in price to adjust the sale rate and the markup. For the watch, the sales rate is decreased by 5% (with a price reduction of $1.75) and the markup is decreased by 10% (with a price reduction of $0.18) such that the new price for the watch is $33.02.

Figure 12:
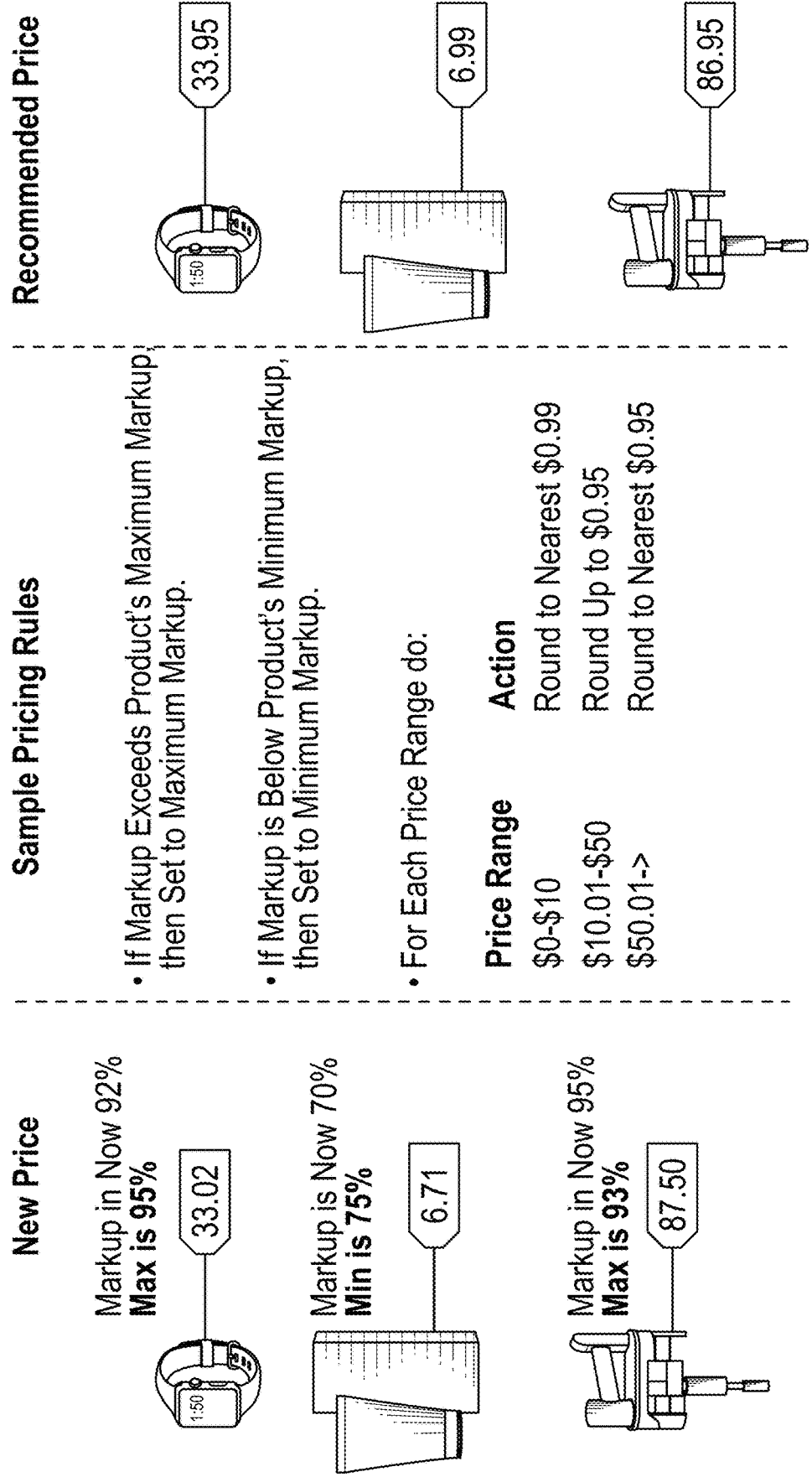
FIG. 12 is an embodiment of an example illustrating pricing rules.

FIG. 12 is an embodiment of an example illustrating a set of example pricing rules which are applied to the new prices of the three products and are used to further adjust the prices. For example, the client may include a markup maximum and a markup minimum as well as rules to follow if the new price exceeds the maximum or is below the minimum, such as setting a markup to a maximum if the markup exceeds the product's maximum markup and/or setting a markup to a minimum if the markup exceeds the product's minimum markup. In some embodiments, the sample pricing rules can also include adjustments to get a price to a "charm" price which may be favored by purchasers. For the example of FIG. 12, if the price is between $0-$10, the price is rounded to the nearest $0.99. For the watch, the markup is now 92% and the maximum is 95%. Because the markup does not exceed the maximum markup, the markup is not changed based on the maximum markup rule. Because the price is between $10.01-$50, the price is rounded up to $0.95. Thus, the recommended price is $33.95.

Figure 13:
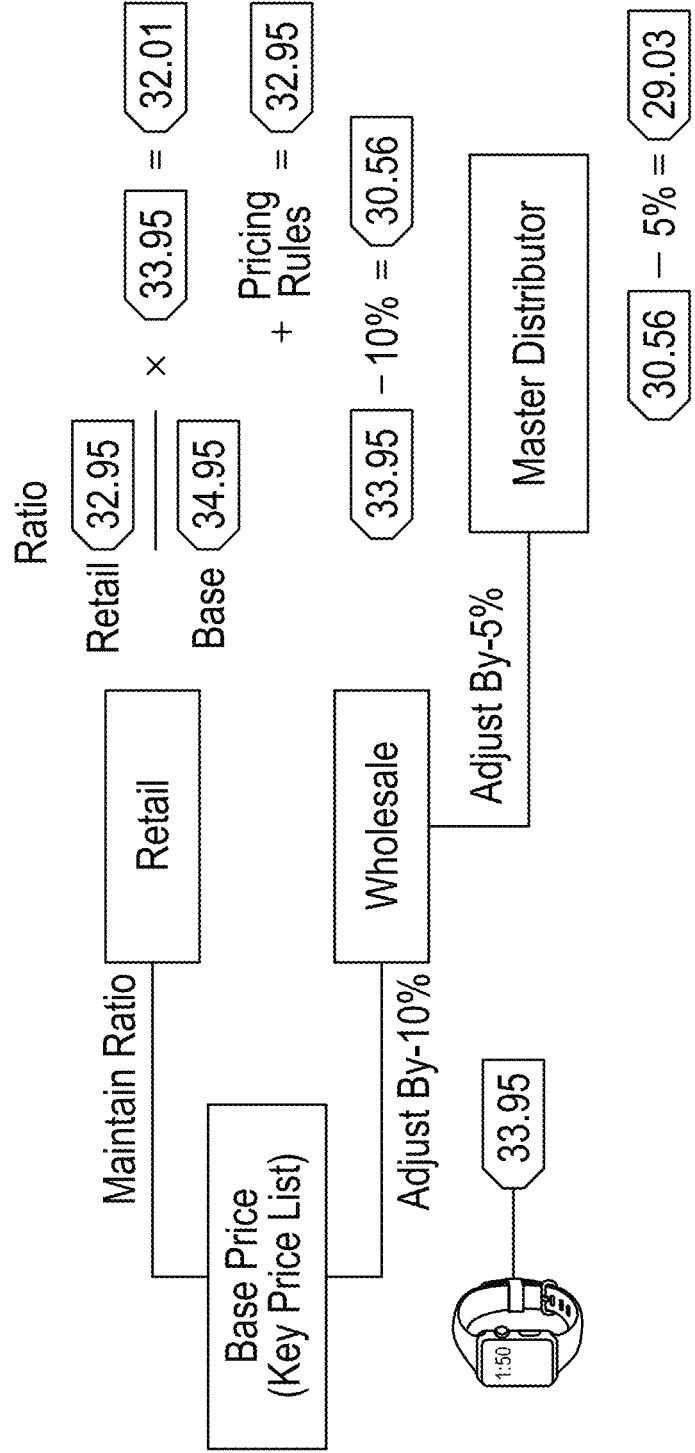
FIG. 13 is an embodiment of an example illustrating a price list tree.

As noted above, some rules may be utilized by the system where a price analysis may change multiple price lists using a price list tree to define a cascading relationship, such as the % to adjust any parent price list, or a specific ratio that should be maintained between two prices lists, such as a parent price list and a child price list. In some embodiments, the price calculation for child prices lists uses cascading and pricing rules and then further cascading to children price lists until the complete price list tree is calculated. FIG. 13 is an embodiment of an example price list tree which includes a base price as well as rules to apply depending on whether the seller is retail, wholesale, or a mass distributor. Based on certain characteristics of the seller, the price can automatically be changed and/or adjusted. For example, for retail sellers, a certain price ratio should be maintained as to the base price, whereas for the wholesaler, the base price should be automatically adjusted by −10%. If the seller is a master distributor, the base price should be adjusted by an additional −5%.

6. Conduct Impact Analyses

Given a set of new prices and both a baseline time period and a projection time period, the system may forecast the impact of the new price changes in terms of financial metrics such as, for example, Units Sold, Total Revenue, Total Cost, Gross Margin, and Profit Margin.

As noted above, in some embodiments the metrics may be calculated for three different contexts:

Actual/Baseline metrics—calculated for the baseline period based on sales history;

Projected metrics—calculated for the projection period based on current prices and a sales forecast which may be a function of product level trend and seasonality; and/or Impact metrics—calculated for the projection period based using the same sales forecast but with new prices and the effect the price changes will have on increasing or decreasing the expected units sold, where one or more factors may be used to influence impact including, for example: elasticity of demand, halo, cannibalization, competitive sensitivity, pull forward effects, and the like.

Optimization of the Price Strategy is then evaluated to find the pricing segment price change values that help achieve the business objectives defined for the each product behavior cluster. Some example objectives may include:

Objective #1: Maximize Revenue change between Actual and Impact as a percent of Actual.

Objective #2: Target a 2 point increase from Projected Profit Margin to Impact Profit Margin.

Objective #3: Minimize Cost change between Projected and Impact as a percent of Projected.

In some embodiments, the optimization model adjusts the pricing strategy parameters that define the pricing segment price change function, calculates prices for the base price level, optionally cascades to other price levels, and optionally applies pricing rules to render final prices. The system then recalculates the business goal impact and continues to adjust the price change parameters until it converges on the best outcome for either the business goal or in the case of multiple goals, a list of outcomes in which the user is presented with a variety of goal attainment possibilities and allowed to select which one to use for pricing.

In some embodiments, the impact calculation includes a price elasticity of demand. The price elasticity of demand can be calculated for each product and/or used to determine the change in units sold:

$$\text{Impact Qty} = \text{Projected Qty} * \left(1 - \text{Elasticity} * \frac{\text{Price Change}}{\text{Current Price}}\right)$$

The impact quantity can further be affected by halo effects from other products with which this one has affinity and can therefore experience a lift or a decline correlated with it. Cannibalization can also be taken into account for products within the same category that have demonstrated cannibalization in the sales history. Competitive Sensitivity can be used to influence impact quantity by measuring its effect on sales as a correlation to the price difference to each competitor throughout collected sales history.

The results of this automated, product performance-based price optimization and impact analysis may then be made available for editing by the user. Warnings, such as, for example, exceeding margin boundaries or minimum advertised price (MAP) settings may be available to the user for edit and correction.

In some embodiments, each product may be mapped to many competitor products, either by internal sources or via competitive price data providers. The new price is compared to calculate the "Competitive Position" relative to the minimum, maximum, and market average prices for competition. The user may then take action on the optimized price versus competition, either singly on in bulk. A product's price may be manually edited by the user, or the price may be excluded entirely from the resulting price change recommendation.

In some embodiments, price changes are determined by using a forecast model to estimate the impact of the price changes. This forecast is calculated at the product level and aggregated for all products being priced within each behavior. The results of the forecast are then used to calculate the expected business objective results. The optimization algorithm evaluates multiple possible solutions by evaluating the impact to the business objectives given the price changes that make up a given solution. The forecast model is used to estimate future sales units based on the proposed price changes in the solution along with their sensitivity to competitor prices, and intra-category sensitivity to other replacement products.

Each product's forecast model is calculated using time series analysis which selects one of many forecast models that use one or more input time series: product price, product unit sales, competitor prices, in-category product prices among others. The models are validated by attempting to forecast the most recent year of sales and using the forecasting error to determine accuracy. A final forecast model is selected by comparing model accuracies and selecting the simplest of the more accurate model options. Since this process is done periodically, forecast model selection will adapt to changes in the product lifecycle and the changes in their marketplace.

Figure 14:
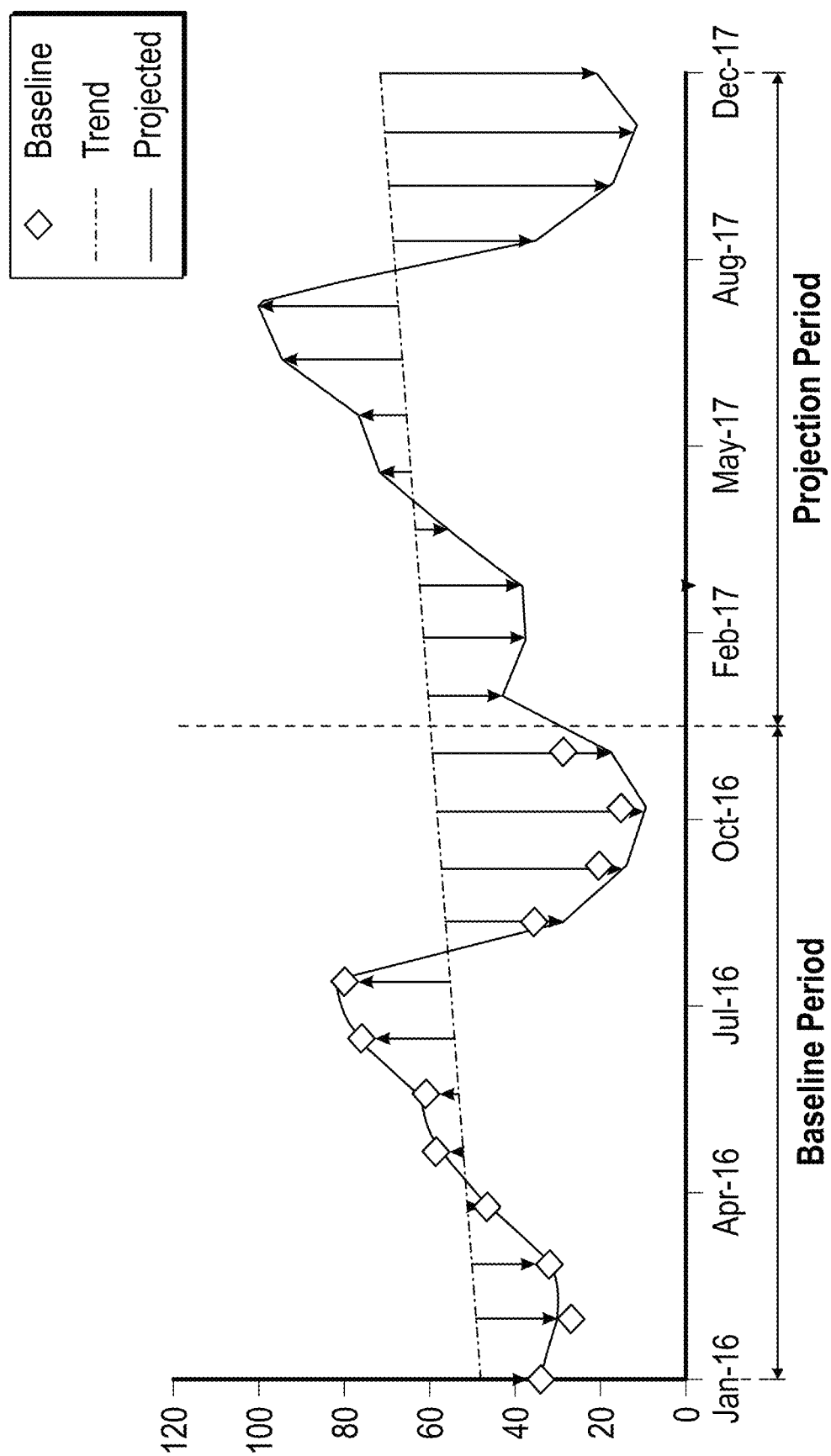
FIG. 14 is an embodiment of an example illustrating an impact analysis.

FIG. 14 is an embodiment of an example illustrating an impact analysis. In this example, a baseline period illustrates a baseline forecast and the forecast is projected into the projection period to determine a projected forecast. Furthermore, seasonality factors can be assessed to make this determination. For example, although sales were low in October of 2016, the impact analysis can determine that October is typically a low season for sales and that in February, the sales increase by a certain percentage based on historical data. The impact analysis can use a history of sales for each product, determine forecast and seasonality factors, and provide a forecast of projected sales.

While several algorithms have been described with respect to a pricing application, it is recognized that such algorithms may be adjusted and applied to other applications.

B. Additional Features

The following provided example embodiments of other features of the product performance-based price optimization and management system 120.

1. Tracking

In some embodiments, after one or more forecast scenarios are complete, the price changes may be routed for approval and implementation. The system may retain a copy of the price changes for products and price levels, along with the product-level forecast(s). As future sales occur for these products, the system may monitor how the price changes have affected sales measures. This comparison of forecast and actual performance can allow the user and/or system to study the strategy employed for price optimization and determine if the price changes are having the desired effect, and/or if adjustments are recommended. In this manner, the system may provide a closed-loop feedback methodology to continually adjust pricing strategies in order to improve optimization.

2. Product Behavior Scenarios

In some embodiments, the system can create pre-defined product behavior scenarios. The predefined product behavior scenarios can allow business decisions to be made ahead of time. A decision making user can define and attach default optimization objectives to each product behavior scenario. As a result, a price adjustment action may be subdivided into multiple actions, one for each product behavior cluster present in the selected products. If the cluster has a set of objectives defined for the product behavior scenario, the set of objectives may be set by default as the objectives to pursue in the price routine that deals with a set of products that exhibit that product behavior.

3. Intelligent Pricing Automation

In some embodiments, the optimization and management system can further automate the price adjustment is introduced by performing automated re-calculation of metrics as new ERP data is loaded each period, such as, for example:
- as significant metric changes are detected, products may be reclassified in a new product behavior scenario, as such, they are flagged for repricing;
- products marked for repricing are run through the pricing optimization process which is done by product behavior scenario and driven by its configured objectives; or
- new prices are published and tracking of the new product prices begins.

4. Competitive Sensitivity

In some embodiments, the system accepts curated competitive price data, either as obtained from automated sources or manually uploaded. By using the competing product price history, the system calculates the correlation between each competitor price difference to the retailer's price and its effect on de-seasonalized unit sales.

Competing products that show a high correlation are the ones that the retailer's product is most sensitive to. With low correlations, the system can identify competitors that have little bearing on sales regardless of their aggressive pricing. By including this information in the sales forecast, the system can better estimate the effects of changes in the retailer's prices and competitor price changes.

VI. Graphical User Interfaces

In some embodiments, the computing environment, including the optimization and management system 120, includes modules for providing graphical user interfaces that allow a user to interact with the optimization and management system 120 via a user interface. The modules may include, but are not limited to, an application on the optimization and management system 120, and application on a remote computing device, a cloud-based program, a remote application, or a web-based interface. Example embodiments are described as follows. FIGS. 15-18 are embodiments of electronic displays showing interfaces for the optimization and management system.

A. Product Navigation

Figure 15:
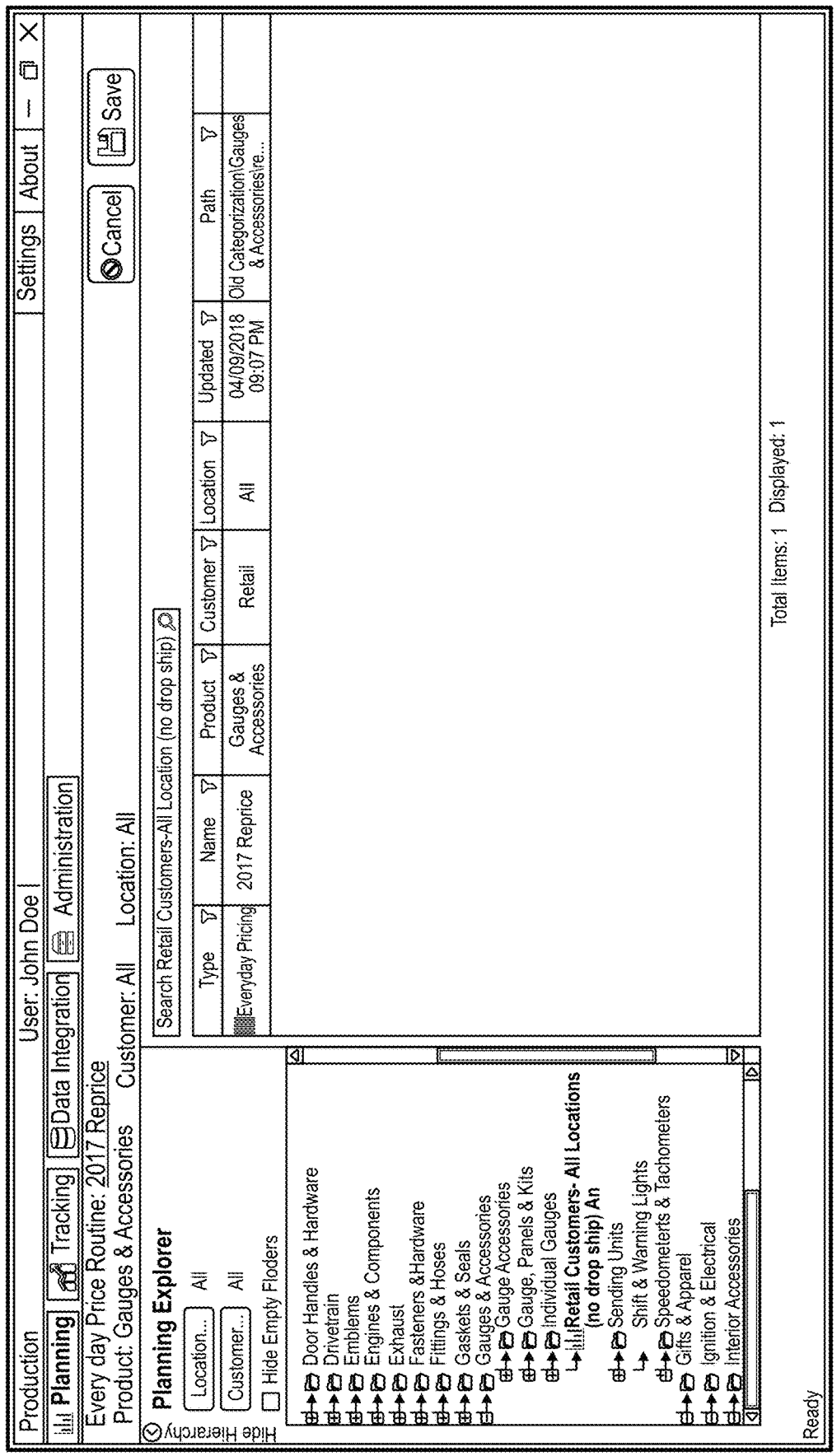

FIG. 15 illustrates an embodiment of an electronic display for product navigation. The graphical user interface displays an illustrative product hierarchy for automotive products with a price routine for the market segment of Gauges & Accessories/Retail selected.

B. Product Behavior Segments

Figure 16:
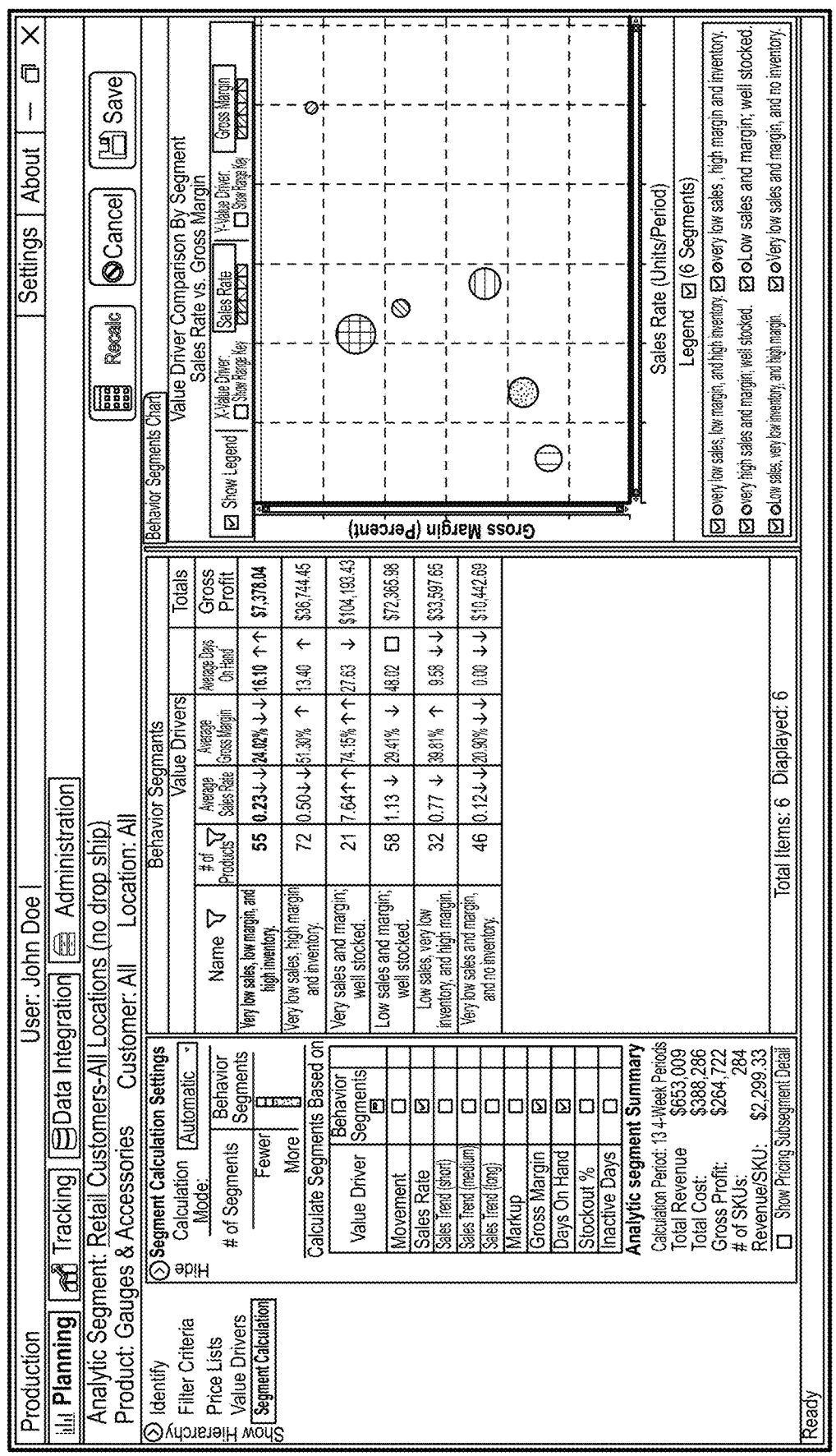

FIG. 16 illustrates an embodiment of an electronic display for product behavior segments that are produced by running our clustering algorithm on 284 products within the market segment of Gauges & Accessories/Retail. In the example of FIG. 16, the clustering algorithm identified six distinct behavior segments in the product set, and the behavior characteristics of each cluster is illustrated in the middle of the screen. The Behavior Segments in the example of FIG. 16 include:

Behavior Segment 1: Very low sales, low margin, and high inventory

Behavior Segment 2: Very low sales, high margin, and inventory

Behavior Segment 3: Very high sales and margin, well stocked

Behavior Segment 4: Low sales and margin, well stocked

Behavior Segment 5: Low sales, very low inventory, and high margin

Behavior Segment 6: very low sales and margin, and no inventory

C. Business Objectives

FIG. 17 illustrates an embodiment of an electronic display for setting specific business objective(s) for each segment after the behavior segments are identified by the clustering algorithm and for running the impact analysis process. Example metrics for each behavior cluster are displayed in panel 1710, and the objectives for the selected segment are shown in panel 1720. For example, a target can include a profit margin % change vs a projected profit margin, where the action is to set a maximum and a required level of 1%. The target measures can be weighted. For example, the profit margin % change can be weighted 30% and the unit sales % change can be weighted 70%.

D. Impact Analysis

Figure 18:
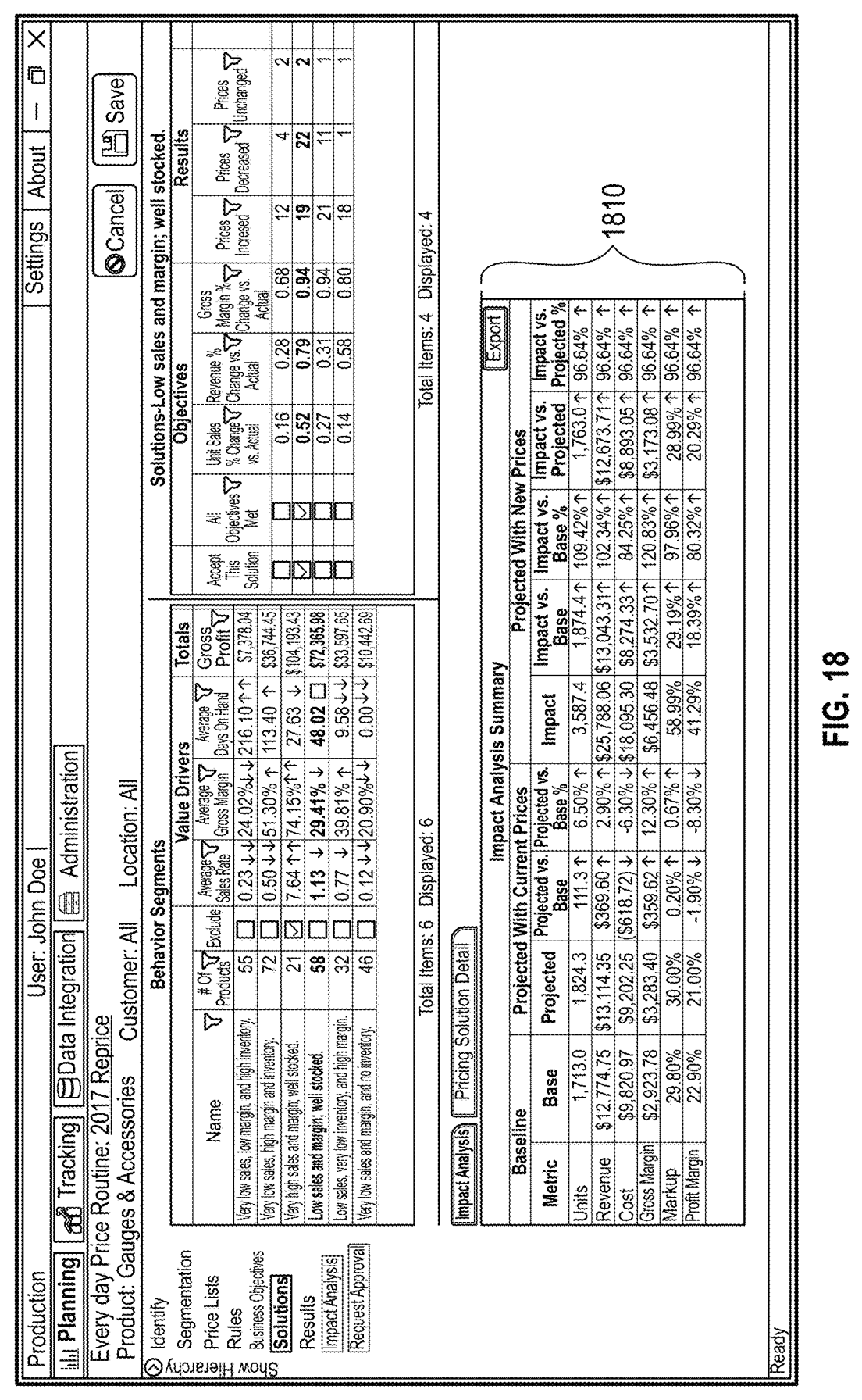

FIG. 18 illustrates an embodiment of an electronic display for the impact analysis results. For each behavior segment, the impact analysis can calculate one or more solutions that meet the business objectives along with the financial impact analysis for each solution. In the example of FIG. 18, the solutions and the financial impact analysis is shown on panel 1810. From this view, the user can select which solution best meets the company's desired business outcome, and the resulting product prices are calculated for all products in the price routine.

VII. Example System Implementation and Architecture

Figure 19:
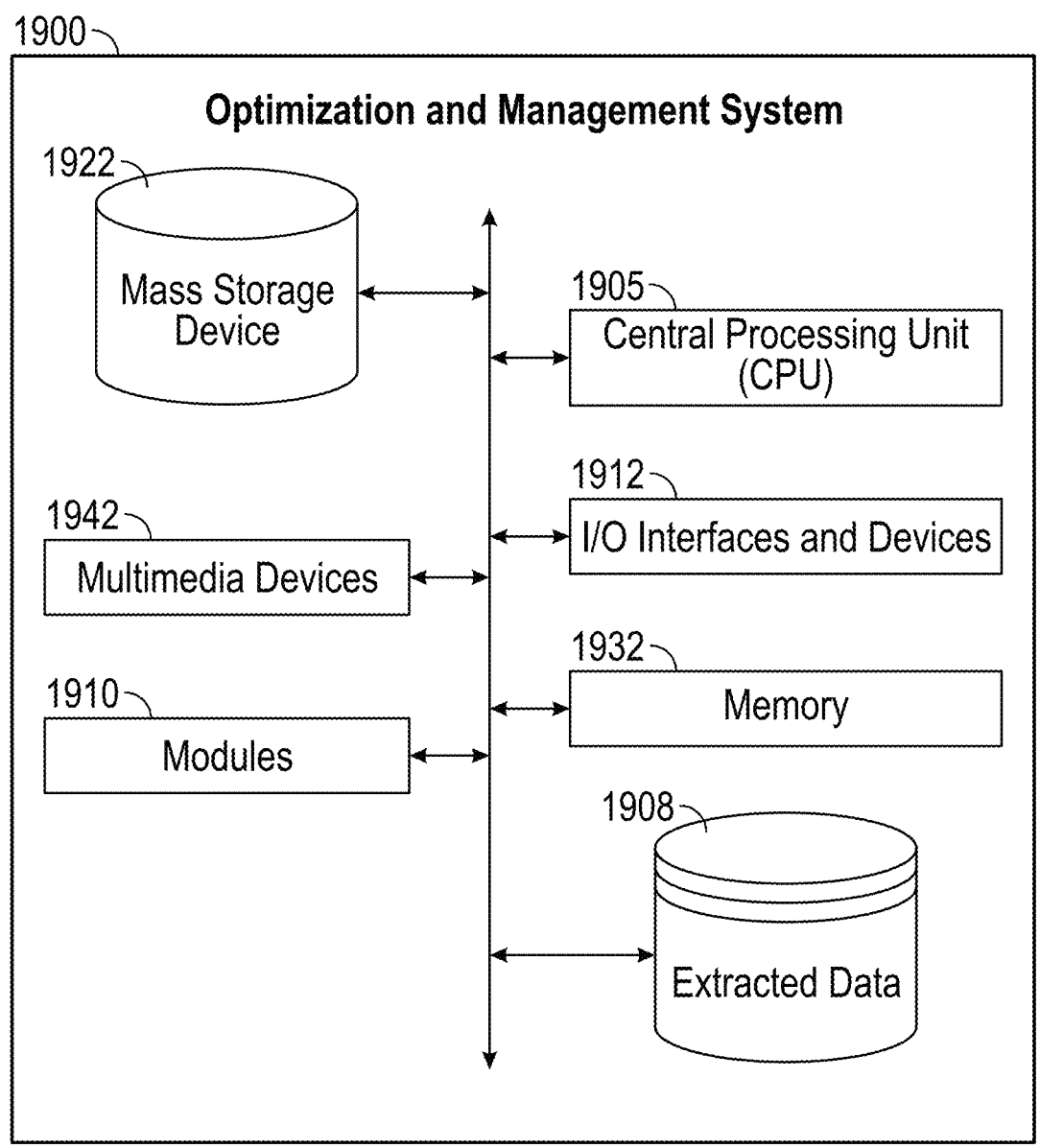
FIG. 19 is a general system diagram illustrating an embodiment of a computing system.

FIG. 19 is a block diagram showing example components of a performance-based pricing optimization and management computing system 1900. The computing system 1900 includes, for example, one or more personal computers that is IBM, Macintosh, or Linux/Unix compatible or a server or workstation. In one embodiment, the computing system 1900 comprises a server, a laptop computer, a smart phone, a personal digital assistant, a tablet, or a desktop computer, for example. In one embodiment, the example computing system 1900 includes one or more central processing unit (CPU) 1905, which may each include a conventional or proprietary microprocessor. The computing system 1900 further includes one or more memory 1932, such as random access memory (RAM) for temporary storage of information, one or more read only memory (ROM) for permanent storage of information, and one or more mass storage device 1922, such as a hard drive, diskette, solid state drive, or optical media storage device. Typically, the components of the computing system 1900 are connected to the computer using a standard based bus system. In different embodiments, the standard based bus system could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of computing system 1900 may be combined into fewer components and modules or further separated into additional components and modules.

The computing system 1900 is generally controlled and coordinated by operating system software, such as Windows XP, Windows Vista, Windows 7, Windows 8, Windows 10, Windows Server, Unix, Linux, SunOS, Solaris, iOS, Blackberry OS, or other compatible operating systems. In Macintosh systems, the operating system may be any available operating system, such as MAC OS X. In other embodiments, the computing system 1900 may be controlled by a proprietary operating system. Conventional operating systems control and schedule computer processes for execution, perform memory management, provide file system, networking, I/O services, and provide a user interface, such as a graphical user interface (GUI), among other things.

The example computing system 1900 may include one or more commonly available input/output (I/O) devices and interfaces 1912, such as a keyboard, mouse, touchpad, and printer. In one embodiment, the I/O devices and interfaces 1912 include one or more display devices, such as a monitor, that allows the visual presentation of data to a user. More particularly, a display device provides for the presentation of GUIs, application software data, reports, benchmarking data, metrics, and/or multimedia presentations, for example. The computing system 1900 may also include one or more multimedia devices 1942, such as speakers, video cards, graphics accelerators, and microphones, for example.

In the embodiment of FIG. 19, the I/O devices and interfaces 1912 provide a communication interface to various external devices. In the embodiment of FIG. 19, the computing system 1900 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the ERP data sources.

In some embodiments, information may be provided to the computing system 1900 over a network from one or more data sources. The data sources may include one or more internal and/or external data sources that provide ERP data. In some embodiments, one or more of the databases or data sources may be implemented using a relational database, such as Sybase, Oracle, CodeBase, PostgreSQL, and Microsoft® SQL Server as well as other types of databases such as, for example, a flat file database, an entity-relationship database, an object-oriented database, a non-relational database, and/or a record-based database.

In general, the word "module," as used herein, refers to logic embodied in hardware or firmware, or to a collection of software instructions, possibly having entry and exit points, written in a programming language, such as, for example, Java, Lua, C, C#, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 1900, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 19, the modules 1910 may be configured for execution by the CPU 1905 to perform any or all of the processes discussed herein. Depending on the embodiment, certain processes, or in the processes, or groups of processes discussed herein may be performed by multiple devices, such as multiple computing systems similar to computing system 1900.

VIII. Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electro-mechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The invention claimed is:

1. A system for executing a data value adjustment routine that automatically adjusts data, the system comprising:
    a network interface configured to provide remote access to a system via a merchant system operated by a merchant;
    a hardware processor configured to execute computer-executable instructions;
    a user interface module comprising computer-executable instructions that when executed by the hardware processor instruct the hardware processor to:
        provide instructions for generating a graphical interface on the display by the merchant at the merchant system;
    a pre-processing module comprising computer-executable instructions that when executed by the hardware processor instruct the hardware processor to:
        access an electronic dataset which: (a) comprises data for plurality of data items related to over a hundred thousand distinct products, and (b) is related to a first electronic entity identifier;
        access data items by segmenting the data items using user-selected segmentation criteria resulting in analytic segments, wherein segmenting the data items comprises segmenting by product type;
        for each analytic segment:
            access segment specific data from the extracted dataset, wherein the segment specific data comprises available inventory and inventory days-on-hand for the corresponding inventory, sales data, and competitive pricing, wherein the inventory, sales data, and competitive pricing are for data items in the corresponding analytic segment;
            calculate a plurality of value drivers by generating value driver data points using the available inventory, inventory days-on-hand, sales, and competitive pricing;
            execute a standardization algorithm using the plurality of value driver data points to generate a plurality of encoded value driver data points categories including one or more rules for equalizing the encoded value driver data point categories for varying plurality of value data driver points across the analytic segments, wherein the standardization algorithm comprises the following to generate the encoded value driver data points categories:

encoded Value=$f(r,EP)$ min:$g(f,EP|R,p^*)$ wherein f is an encoding function, r is an extracted value of the value driver data points, EP is an encoding parameter, g is a Euclidean distance, and $p^*$ is a desired distribution;

receive a selection of value drivers to use for clustering, wherein the value drivers are specific to each analytic segment; and apply a clustering algorithm to the plurality of value driver data points using the selected value drivers to generate clusters of behavior groupings that share similar value driver data point values;

an automated update module comprising computer-executable instructions that when executed by the hardware processor instruct the hardware processor to:

receive an indication of a selected set of data items associated with one or more segments related to the first electronic entity identifier;

for each cluster of behavior groupings, determine a strategy related to the first electronic entity identifier, wherein the strategy is determined by user-preselected criteria based on objectives of strategy metrics;

identify a set of segments associated with the merchant system;

extract data related to records for the selected set of data items within the extracted dataset, wherein the extracted dataset corresponds to the set of segments for the merchant system;

generate and transmit, to the merchant system, an encrypted electronic data package comprising executable instructions, wherein the executable instructions, when executed by a processor, cause the processor to automatically perform:

a data value update routine that adjusts data values associated with a first data characteristic in the data to generate adjusted data values, wherein the data value update routine includes:

automatically adjusting the data values using the plurality of sets of executable rules to generate adjusted data values;

determining a baseline forecast over a baseline time period and projected forecast over a projection time period using the data values; and performing an impact analysis to forecast an impact of the adjusted data values using the adjusted data values to generate a set of resulting objective measurements; and a graphical user interface routine that includes:

providing a first graphical user interface data for displaying a set of objective outcomes to the merchant system;

receiving a selection from the merchant system a preferred outcome;

generating an updated data set associated with the selected preferred outcome correlating to the adjusted data values; and automatically applying the updated data set to a dataset of the merchant system.

2. The system of claim 1, wherein applying the clustering algorithm includes using a distance measurement function.

3. The system of claim 1, wherein performing the impact analysis is based on actual metrics, projected metrics, or impact metrics.

4. The system of claim 1, wherein performing the impact analysis includes accessing a pre-selected set of metrics.

5. The system of claim 1, wherein the plurality of sets of executable rules includes a conditional rule, a change rule, or a conditional range rule.

6. The system of claim 1, wherein the plurality of sets of executable rules includes a cascading relationship of multiple rules.

7. The system of claim 1, wherein performing the impact analysis is further based on effects from other data items different from the selected set of data items.

8. The system of claim 1, wherein performing the impact analysis is further based on an effect for data items within sub-segments of the same segments associated with the selected set of data items.

9. The system of claim 1, wherein performing the impact analysis is further based on a competitor sensitivity correlated with a difference between the adjusted data values and corresponding data values of data items provided by one or more competitors.

10. The system of claim 1, wherein the set of objective outcomes is based on the impact analysis, wherein the system uses a multi-objective optimization algorithm to determine value adjustment parameters for the objectives of performance metrics on each cluster of behavior groupings.

11. The system of claim 1, wherein the first user interface comprises: a listing of the cluster of behavior groupings; and a two dimensional graph, wherein a first axis of the graph is a first value driver based on inventory or inventory days-on-hand, and a second axis of the graph is a second value driver based on sales or competitive pricing, wherein the two dimensional graph comprises graphical indicators corresponding to segments.

12. A method for executing an adjustment routine that automatically adjusts data by performing impact analysis to forecast an impact of the adjusted data on a set of metrics based on a baseline forecast, a projected forecast, and seasonality factors, the method comprising:

accessing an electronic dataset which: (a) comprises data for plurality of data items related to over a hundred thousand distinct products, the data including data management data, and (b) is related to a first electronic entity identifier;

accessing data items by segmenting the data items using user-selected segmentation criteria resulting in analytic segments, wherein segmenting the data items comprises segmenting by product type;

for one or more analytic segments:

extracting segment specific data from the dataset, wherein the segment specific data comprises available inventory and inventory days-on-hand for the corresponding inventory, sales data, and competitive pricing, wherein the inventory, sales data, and competitive pricing are for data items in the corresponding analytic segment;

calculating a plurality of value driver data points using the available inventory, inventory days-on-hand, sales, and competitive pricing;

executing a standardization algorithm using the plurality of value driver data points to generate a plurality of encoded value driver data points categories including one or more rules for equalizing the encoded value driver data point categories for varying plurality of value data driver points across the analytic segments, wherein the standardization algorithm comprises the following to generate the encoded value driver data points categories:

encoded Value=$f(r,EP)$ min:$g(f,EP|R,p^*)$ wherein f is an encoding function, r is an extracted value of the value driver data points, EP is an encoding parameter, g is a Euclidean distance, and p* is a desired distribution;

accessing an indication of a selected value driver to use for clustering, wherein the value drivers are specific to each analytic segment; and applying a clustering algorithm to the one or more encoded value driver data points using the selected value drivers to generate clusters of behavior groupings that share similar value driver data points;

determining a selected set of data items associated with one or more segments related to the first electronic entity identifier;

determining a strategy related to the first electronic entity identifier, wherein the strategy is determined by user-preselected criteria based on objectives of strategy metrics;

identifying a set of segments associated with a merchant system;

extracting data related to records for the selected set of data items within the dataset, wherein the extracted data corresponds to the set of segments;

generating and transmitting, to the merchant system, an encrypted electronic data package comprising executable instructions, wherein the executable instructions, when executed by a processor, cause the processor to perform:

an adjustment routine that adjusts one or more data values within the extracted data, wherein the adjustment routine includes:

automatically adjusting the one or more data values using a set of executable rules;

determining a baseline forecast over a baseline time period, projected forecast over a projection time period, or one or more seasonality factors associated with the selected set of data items based on the extracted data; and performing an impact analysis based on the baseline forecast, the projected forecast, or the one or more seasonality factors to forecast the impact of the adjusted one or more data values to generate a first set of resulting objective measurements;

generating an updated dataset associated with a preferred outcome including the adjusted one or more data values, wherein the preferred outcome is based on the impact analysis of the adjusted one or more data values; and automatically applying the updated dataset to a dataset of the merchant system, wherein the method is performed by at least one processor.

13. The method of claim 12, wherein performing the impact analysis includes accessing a pre-selected set of metrics.

14. The method of claim 12, wherein the set of executable rules includes a conditional rule, a change rule, or a conditional range rule.

15. The method of claim 12, wherein the set of executable rules includes a cascading relationship.

16. A non-transitory computer storage medium storing computer-executable instructions that, when executed by a processor, cause the processor to perform the following method:

accessing an electronic dataset which: (a) comprises data for plurality of data items related to over a hundred thousand distinct products, the data including data management data, and (b) is related to a first electronic entity identifier;

accessing data items by segmenting the data items using user-selected segmentation criteria resulting in analytic segments, wherein segmenting the data items comprises segmenting by product type;

for one or more analytic segments:

extracting segment specific data from the electronic enterprise resource planning dataset, wherein the segment specific data comprises available inventory and inventory days-on-hand for the corresponding inventory, sale data, and competitive pricing, wherein the inventory, sales, and competitive pricing are for data items in the corresponding analytic segment;

calculating a plurality of value driver data points using the available inventory, inventory days-on-hand, sales, and competitive pricing;

executing a standardization algorithm using the plurality of value driver data points to generate a plurality of encoded value driver data points categories including one or more rules for equalizing the encoded value driver data point categories for varying plurality of value data driver points across the analytic segments, wherein the standardization algorithm comprises the following to generate the encoded value driver data points categories:

encoded Value–$f(r, EP)$ min:$g(f, EP | R, p^*)$ wherein f is an encoding function, r is an extracted value of the value driver data points, EP is an encoding parameter, g is a Euclidean distance, and p* is a desired distribution;

accessing an indication of a selected value driver to use for clustering, wherein the value drivers are specific to each analytic segment;

applying a clustering algorithm to the one or more encoded value driver data points using the selected value drivers to generate clusters of behavior groupings that share similar value driver data points;

determining a selected set of data items associated with one or more segments related to the first electronic entity identifier;

determining a strategy related to the first electronic entity identifier, wherein the strategy is determined by user-preselected criteria based on objectives of strategy metrics;

identifying a set of segments associated with a merchant system;

extracting data related to records for the selected set of data items within the electronic dataset, wherein the extracted data corresponds to the set of segments;

automatically generating and transmitting, to the merchant system, an encrypted electronic data package comprising executable instructions, wherein the executable instructions, when executed by a processor, cause the processor to perform:

executing an adjustment routine that adjusts one or more data values within the extracted data, wherein the adjustment routine includes:

automatically adjusting the one or more data values using a set of executable rules;

determining a baseline forecast over a baseline time period, projected forecast over a projection time period, or one or more seasonality factors associated with the selected set of data items based on the extracted data; and performing an impact analysis based on the baseline forecast, the projected forecast, or the one or more seasonality factors to forecast the impact of the adjusted one or more data values to generate a first set of resulting objective measurements;

generating an updated dataset associated with a preferred outcome including the adjusted one or more data values, wherein the preferred outcome is based on the impact analysis of the adjusted one or more data values; and automatically applying the updated dataset to a data set of the merchant system.

17. The non-transitory computer storage medium of claim 16, wherein performing the impact analysis is further based on effects from other data items different from the selected set of data items.

18. The non-transitory computer storage medium of claim 16, wherein performing the impact analysis is further based on an effect for data items within sub-segments of the same segments associated with the selected set of data items.

19. The non-transitory computer storage medium of claim 16, wherein performing the impact analysis is further based on a competitor sensitivity correlated with a difference between the adjusted data values and corresponding data values of data items provided by one or more competitors.

* * * * *

UNITED STATES PATENT AND TRADEMARK OFFICE
CERTIFICATE OF CORRECTION

PATENT NO. : 11,062,250 B1  
APPLICATION NO. : 15/966555  
DATED : July 13, 2021  
INVENTOR(S) : David H. Leonard et al.

Page 1 of 1

It is certified that error appears in the above-identified patent and that said Letters Patent is hereby corrected as shown below:

In the Specification

In Column 5, Lines 55-56, delete "In some embodiments, the data extraction modules 122 receive".

In Column 11, Line 10 (Approx.), delete "Csekanowski" and insert --Czekanowski--.

In Column 16, Line 65, delete "distributers." and insert --distributers--.

In Column 18, Line 5, delete "GI:" and insert --G1:--.

In the Claims

In Column 32, Claim 16, Line 9, delete "sales," and insert --sale data,--.

Signed and Sealed this  
Fifth Day of October, 2021

Drew Hirshfeld  
*Performing the Functions and Duties of the  
Under Secretary of Commerce for Intellectual Property and  
Director of the United States Patent and Trademark Office*